US009439242B2

(12) United States Patent
Stapleton et al.

(10) Patent No.: US 9,439,242 B2
(45) Date of Patent: Sep. 6, 2016

(54) TIME SYNCHRONIZED ROUTING IN A DISTRIBUTED ANTENNA SYSTEM

(71) Applicant: DALI SYSTEMS CO. LTD., George Town, Grand Cayman, KY (US)

(72) Inventors: Shawn Patrick Stapleton, Burnaby (CA); Qianqi Zhuang, Richmond (CA)

(73) Assignee: Dali Systems Co., Ltd., George Town (KY)

( * ) Notice: Subject to any disclaimer, the term of this patent is extended or adjusted under 35 U.S.C. 154(b) by 38 days.

(21) Appl. No.: 13/960,346

(22) Filed: Aug. 6, 2013

(65) Prior Publication Data

US 2014/0162713 A1 Jun. 12, 2014

Related U.S. Application Data

(60) Provisional application No. 61/682,632, filed on Aug. 13, 2012.

(51) Int. Cl.
| | |
|---|---|
| *H04W 56/00* | (2009.01) |
| *H04W 88/08* | (2009.01) |
| *H04W 40/06* | (2009.01) |
| *H04W 40/02* | (2009.01) |

(52) U.S. Cl.
CPC ........... *H04W 88/085* (2013.01); *H04W 40/02* (2013.01); *H04W 40/06* (2013.01); *H04W 56/003* (2013.01)

(58) Field of Classification Search
CPC ....................... H04W 56/0045; H04W 56/004
USPC ............ 455/509, 3.03, 3.01, 18, 515, 67.11, 455/67.16, 66.1, 78, 456.2; 370/280; 342/357.39
See application file for complete search history.

(56) References Cited

U.S. PATENT DOCUMENTS

| | | | | |
|---|---|---|---|---|
| 2009/0180407 | A1* | 7/2009 | Sabat et al. | 370/280 |
| 2010/0178936 | A1* | 7/2010 | Wala et al. | 455/456.2 |
| 2012/0208584 | A1* | 8/2012 | Liao | H04B 17/12 455/509 |
| 2013/0122830 | A1* | 5/2013 | Wang et al. | 455/78 |

* cited by examiner

*Primary Examiner* — John J Lee
(74) *Attorney, Agent, or Firm* — Kilpatrick Townsend & Stockton LLP

(57) ABSTRACT

A system for routing signals in a Distributed Antenna System includes a plurality of Digital Access Units (DAUs) and a plurality of Digital Remote Units (DRUs). The plurality of DAUs are coupled and operable to route signals between the plurality of DAUs. The plurality of DRUs are coupled to the plurality of DAUs and operable to transport signals between DRUs and DAUs. The system also includes a plurality of Base Transceiver Stations (BTS) and a plurality of Base Transceiver Station sector RF connections coupled to the plurality of DAUs and operable to route signals between the plurality of DAUs and the plurality of Base Transceiver Stations sector RF port connections. The system further includes one or more delay compensation merge units operable to delay signals transmitted from or received by each of the plurality of DRUs.

13 Claims, 22 Drawing Sheets

S1@ Local Router A  Physical Node 1  →  S1@ Remote Router M  Physical Node 1

| | IN | OUT |
|---|---|---|
| Router A | External Port 1D | LAN Port 1, Stream AA |
| Router M | LAN Port 1, Stream AA | External Port 1D |

1206

S2@ Local Router A  Physical Node 2  →  S2@ Remote Router P  Physical Node 2

| | IN | OUT |
|---|---|---|
| Router A | External Port 2D | PEER Port M, Stream BB |
| Router B | PEER Port 1, Stream BB | LAN Port 3, Stream BB |
| Router P | LAN Port 1, Stream BB | External Port 2D |

1207

S1@ Local Router A  Physical Node 1 + S3@ Local Router B  Physical Node 1 → S1+S3@ Remote Router O  Physical Node 1

| | IN | OUT |
|---|---|---|
| Router A | External Port 1D | PEER Port M, Stream AA |
| Router B | PEER Port 1, Stream AA | MERGE α IN 1 |
| Router B | External Port 1D | MERGE α IN 2 |
| Router B | MERGE α OUT | LAN Port 2, Stream AA |
| Router O | LAN Port 1, Stream AA | External Port 1D |

1208

Down Stream Routing Examples

FIG. 12
(Continued)

S3@ Remote Router O  Physical Node 1  à  S3@ Local Router B  Physical Node 1

1306

| | IN | OUT |
|---|---|---|
| Router O | External Port 1U | LAN Port 1, Stream AA |
| Router B | LAN Port 2, Stream AA | External Port 1U |

S4@ Remote Router P  Physical Node 2  à  S4@ Local Router A  Physical Node 2

1307

| | IN | OUT |
|---|---|---|
| Router P | External Port 2U | LAN Port 1, Stream BB |
| Router B | LAN Port 3, Stream BB | PEER Port 1, Stream BB |
| Router A | PEER Port M, Stream BB | External Port 2U |

1308

| | IN | OUT |
|---|---|---|
| Router N | External Port 1U | PEER Port 1, Stream AA |
| Router M | PEER Port M, Stream AA | MERGE α IN 1 |
| Router M | External Port 1U | MERGE α IN 2 |
| Router M | MERGE α OUT | LAN Port 1, Stream AA |
| Router A | LAN Port 1, Stream AA | External Port 1U |

Up Stream Routing Examples

*FIG. 13*
*(Continued)*

TIME SYNCHRONIZED ROUTING IN A DISTRIBUTED ANTENNA SYSTEM

CROSS-REFERENCES TO RELATED APPLICATIONS

This application claims priority to U.S. Provisional Patent Application No. 61/682,632, filed on Aug. 13, 2012, entitled "Time Synchronized Routing in a Distributed Antenna System," the disclosure of which is hereby incorporated by reference in its entirety for all purposes.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. One of the most difficult challenges faced by network operators is maximizing the capacity of their Distributed Antenna System (DAS) networks while ensuring cost-effective DAS deployments and at the same time providing a very high degree of DAS remote unit availability.

Despite the progress made in DAS networks, there is a need in the art for improved methods and systems for DAS networks.

SUMMARY OF THE INVENTION

The present invention generally relates to wireless communication systems employing Distributed Antenna Systems (DAS) as part of a distributed wireless network. More specifically, the present invention relates to a DAS utilizing software configurable radio (SCR). Wireless and mobile network operators face the continuing challenge of building networks that effectively manage high data-traffic growth rates. Mobility and an increased level of multimedia content for end users typically employs end-to-end network adaptations that support new services and the increased demand for broadband and flat-rate Internet access. The DAS network has a requirement to transmit the wireless signals synchronously out of each Digital Remote Unit (DRU). The network of DAS nodes need to be delay calibrated and compensated to insure that the signals are transmitted and received synchronously from each DRU. The optimum signal to interference plus noise (SINR) performance is achieved when the wireless signals are time synchronized in a DAS network.

According to an embodiment of the present invention, a system for routing signals in a Distributed Antenna System is provided. The system includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs and a plurality of Base Transceiver Stations (BTS). The system further includes a plurality of Base Transceiver Station sector RF connections coupled to the plurality of DAUs and operable to route signals between the plurality of DAUs and the plurality of Base Transceiver Stations sector RF port connections and one or more delay compensation merge units operable to delay signals transmitted from or received by each of the plurality of DRUs.

According to another embodiment of the present invention, a method for routing signals in a Distributed Antenna System including a plurality of Digital Access Units (DAUs), a plurality of Digital Remote Units (DRUs), a plurality of Base Transceiver Stations (BTS), and a plurality of Base Transceiver Station sector RF connections is provided. The method includes transporting signals between the DRUs and the DAUs, routing the signals between DAUs, and routing the signals between DAUs and the plurality of BTS sector RF port connections. The method also includes providing routing tables, using a first delay compensation merge unit in a first DRU of the DRUs to delay a first signal, and using a second delay compensation merge unit in a second DRU of the DRUs to delay a second signal.

According to a specific embodiment of the present invention, a DAS is provided. The DAS includes a DAU and a set of DRUs coupled to the DAU in a daisy chain configuration. One or more of the set of DRUs includes a delay compensation merge unit.

According to another specific embodiment of the present invention, a DAS is provided. The DAS includes a DAU and a first set of DRUs coupled to the DAU. One or more of the first set of DRUs includes a delay compensation merge unit. The DAS also includes a second set of DRUs coupled to the DAU. One or more of the second set of DRUs includes a delay compensation merge unit.

According to an particular embodiment of the present invention, a method of communicating in a DAS network is provided. The method includes receiving, at a first DRU, a first uplink signal and transmitting the first uplink signal to a second DRU. For example, transmitting the first uplink signal can include transmitting a converted version of the first uplink signal. The method also includes receiving, at a second DRU, a second uplink signal and the first uplink signal and introducing a time delay to the first uplink signal, which can include electronically delaying the first uplink signal. The method further includes summing the second uplink signal and the time delayed first uplink signal to form a summed signal and transmitting the summed signal to a DAU.

The DAS network can include the first DRU daisy chained to the second DRU. In an embodiment, the second uplink signal and the time delayed first uplink signal are time aligned prior to summing.

According to another particular embodiment of the present invention, a method of communicating in a DAS network is provided. The method includes receiving, at a first DRU, a first uplink signal and a signal from a first coupled DRU and introducing a first time delay to the first uplink signal. The method also includes summing the signal from the first coupled DRU and the time delayed first uplink signal to form a first summed signal and transmitting the first summed signal to a DAU. The method further includes receiving, at a second DRU, a second uplink signal and a signal from a second coupled DRU, introducing a second time delay to the second uplink signal, and introducing a third time delay to the signal from the second coupled DRU. The third time delay is associated with a transit time from the DAU to the second DRU. Additionally, the method includes summing the signal from the second coupled DRU and the time delayed second uplink signal to form a second summed signal and transmitting the second summed signal to the DAU.

The first coupled DRU can include a DRU daisy chained to the first DRU. The second coupled DRU can include a DRU daisy chained to the second DRU. In an embodiment, the first time delay is associated with a transit time from the first coupled DRU to the first DRU. In another embodiment, the second time delay is associated with a transit time from the second coupled DRU to the second DRU. Moreover, the second time delay can be a function of the third time delay and a transit time from the second coupled DRU to the second DRU. For example, at least one of the first time delay or the second time delay can be a zero delay.

Numerous benefits are achieved by way of the present invention over conventional techniques. For example, embodiments of the present invention provide a high degree of flexibility to manage, control, enhance and facilitate radio resource efficiency, usage and overall performance of the distributed wireless network. Other embodiments enable specialized applications and enhancements including, but not limited to, flexible simulcast, automatic traffic load-balancing, network and radio resource optimization, network calibration, autonomous/assisted commissioning, carrier pooling, automatic frequency selection, radio frequency carrier placement, traffic monitoring, and/or traffic tagging. These and other embodiments of the invention along with many of its advantages and features are described in more detail in conjunction with the text below and attached figures.

DETAILED DESCRIPTION OF SPECIFIC EMBODIMENTS

Figure 1:
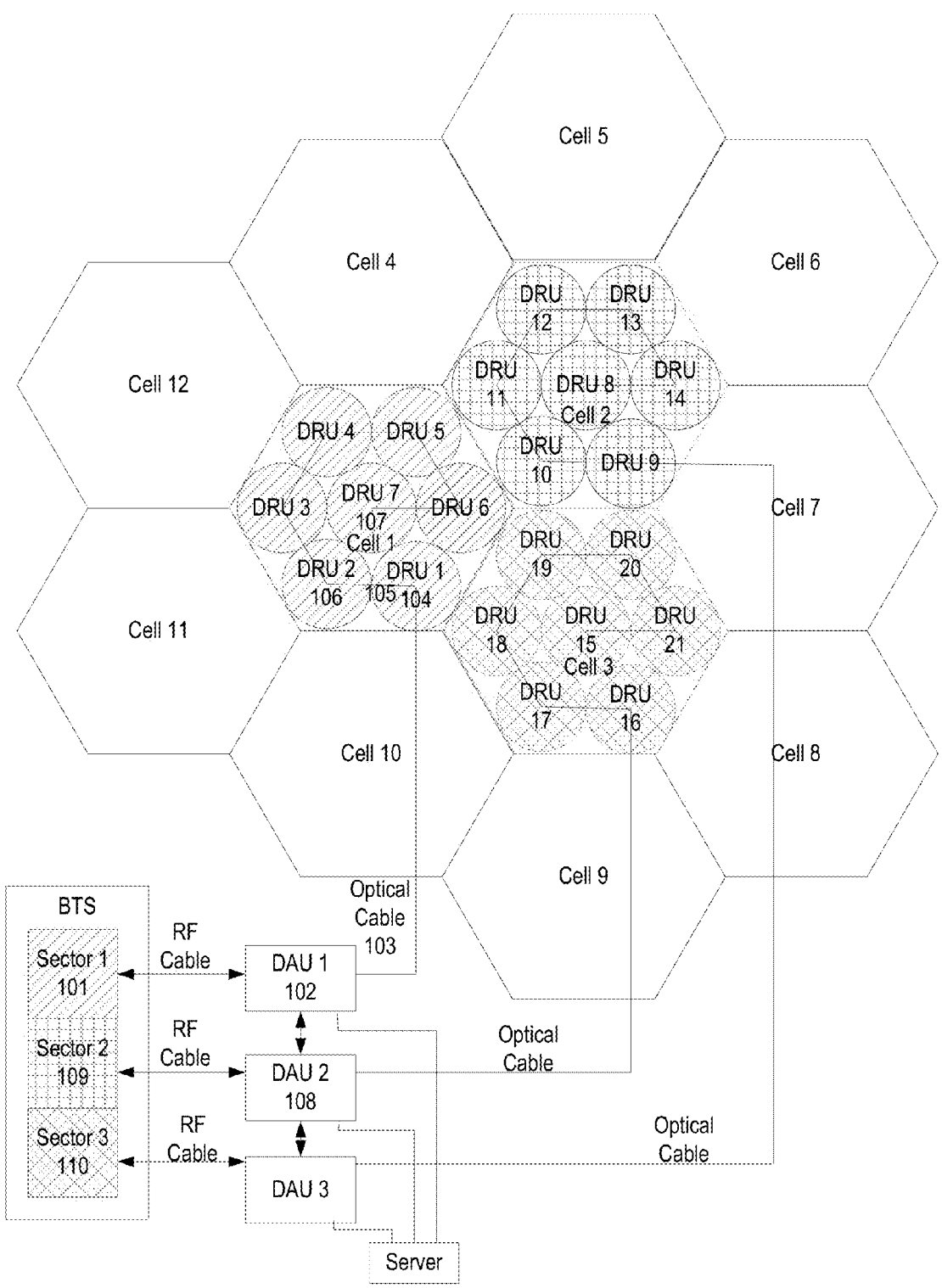
FIG. 1 is a block diagram according to one embodiment of the invention showing the basic structure and an example of the transport routing based on having a single 3 sector BTS with 3 DAUs and 7 DRUs daisy chained together for each cell.

To accommodate variations in wireless subscriber loading at wireless network antenna locations at various times of day and for different days of the week, there are several candidate conventional approaches.

One approach is to deploy many low-power high-capacity base stations throughout the facility. The quantity of base stations is determined based on the coverage of each base station and the total space to be covered. Each of these base stations is provisioned with enough radio resources, i.e., capacity and broadband data throughput to accommodate the maximum subscriber loading which occurs during the course of the workday and work week. Although this approach typically yields a high quality of service for wireless subscribers, the notable disadvantage of this approach is that many of the base stations' capacity is being wasted for a large part of the time. Since a typical indoor wireless network deployment involves capital and operational costs which are assessed on a per-subscriber basis for each base station, the typically high total life cycle cost for a given enterprise facility is far from optimal.

A second candidate approach involves deployment of a DAS along with a centralized group of base stations dedicated to the DAS. A conventional DAS deployment falls into one of two categories. The first type of DAS is "fixed", where the system configuration doesn't change based on time of day or other information about usage. The remote units associated with the DAS are set up during the design process so that a particular block of base station radio resources is thought to be enough to serve each small group of DAS remote units. A notable disadvantage of this approach is that most enterprises seem to undergo frequent re-arrangements and re-organizations of various staff groups within the enterprise. Therefore, it's highly likely that the initial DAS setup will need to be changed from time to time, requiring deployment of additional direct staff and contract resources with appropriate levels of expertise regarding wireless networks.

The second type of DAS is equipped with a type of network switch which allows the location and quantity of DAS remote units associated with any particular centralized base station to be changed manually. Although this approach would appear to support dynamic DAS reconfiguration based on the needs of the enterprise or based on time of day, it frequently implies that additional staff resources would need to be assigned to provide real-time management of the network. Another issue is that it's not always correct or best to make the same DAS remote unit configuration changes back and forth on each day of the week at the same times of day. Frequently it is difficult or impractical for an enterprise IT manager to monitor the subscriber loading on each base station. And it is almost certain that the enterprise IT manager has no practical way to determine the loading at a given time of day for each DAS remote unit; they can only guess the percentage loading.

Another major limitation of conventional DAS deployments is related to their installation, commissioning and optimization process. Some challenging issues which must be overcome include selecting remote unit antenna locations to ensure proper coverage while minimizing downlink interference from outdoor macro cell sites, minimizing uplink interference to outdoor macro cell sites, and ensuring proper intra-system handovers while indoors and while moving from outdoors to indoors (and vice-versa). The process of performing such deployment optimization is frequently characterized as trial-and-error. Therefore, the results may not be consistent with a high quality of service.

Based on the conventional approaches described herein, it is apparent that a highly efficient, easily deployed and dynamically reconfigurable wireless network is not achievable with conventional systems and capabilities. Embodiments of the present invention substantially overcome the limitations of the conventional approach discussed above. The advanced system architecture provided by embodiments of the present invention provides a high degree of flexibility to manage, control, enhance and facilitate radio resource efficiency, usage and overall performance of the distributed wireless network. This advanced system architecture enables specialized applications and enhancements including, but not limited to, flexible simulcast, automatic traffic load-balancing, network and radio resource optimization, network calibration, autonomous/assisted commissioning, carrier pooling, automatic frequency selection, radio frequency carrier placement, traffic monitoring, and/or traffic tagging. Embodiments of the present invention can also serve multiple operators, multi-mode radios (modulation-independent) and multiple frequency bands per operator to increase the efficiency and traffic capacity of the operators' wireless networks.

Accordingly, embodiments of this DAS network provide a capability for Flexible Simulcast. With Flexible Simulcast, the amount of radio resources (such as RF carriers, LTE Resource Blocks, CDMA codes or TDMA time slots) assigned to a particular DRU or group of DRUs can be set via software control to meet desired capacity and throughput objectives or wireless subscriber needs. Applications of the present invention are suitable to be employed with distributed base stations, distributed antenna systems, distributed repeaters, mobile equipment and wireless terminals, portable wireless devices, and other wireless communication systems such as microwave and satellite communications.

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs. A typical base station comprises 3 independent radio resources, commonly known as sectors. These 3 sectors are typically used to cover 3 separate geographical areas without creating co-channel interference between users in the 3 distinct sectors.

An embodiment shown in FIG. 1 illustrates a basic DAS network architecture according to an embodiment of the present invention and provides an example of a data transport scenario between a 3 sector Base Station and multiple DRUs. In this embodiment, the DRUs are daisy chained together to achieve coverage in a specific geographical area. Each individual sector covers an independent geographical area, which is identified as a Cell.

FIG. 1 depicts a DAS system employing multiple Digital Remote Units (DRUs) and multiple Digital Access Units (DAUs). In accordance with the present invention, each DRU provides unique header information associated with each DRU which uniquely identifies uplink data received by that particular Digital Remote Unit.

One feature of embodiments of the present invention is the ability to route Base Station radio resources among the DRUs or group(s) of DRUs. In order to route radio resources available from one or more Base Stations, it is desirable to configure the individual router tables of the DAUs and DRUs in the DAS network. This functionality is provided by embodiments of the present invention.

The DAUs are networked together to facilitate the routing of DRU signals among multiple DAUs. The DAUs support the transport of the RF downlink and RF uplink signals between the Base Station and the DRUs. This architecture enables the various Base Station signals to be transported simultaneously to and from multiple DRUs. PEER ports are used for interconnecting DAUs and interconnecting DRUs.

The DAUs have the capability to control the gain (in small increments over a wide range) of the downlink and uplink signals that are transported between the DAU and the base station (or base stations) connected to that DAU. This capability provides flexibility to simultaneously control the uplink and downlink connectivity of the path between a particular DRU (or a group of DRUs via the associated DAU or DAUs) and a particular base station sector.

Embodiments of the present invention use router tables to configure the networked DAUs. The local router tables establish the mapping of the inputs to the various outputs. Internal Merge blocks are utilized for the Downlink Tables when the inputs from an External Port and a PEER Port need to merge into the same data stream. Similarly, Merge blocks are used in the Uplink Tables when the inputs from the LAN Ports and PEER Ports need to merge into the same data stream.

The remote router tables establish the mapping of the inputs to the various outputs. Internal Merge blocks are utilized for the Downlink Tables when the inputs from a LAN Port and a PEER Port need to merge into the same data stream. Similarly, Merge blocks are used in the Uplink Tables when the inputs from the External Ports and PEER Ports need to merge into the same data stream.

As shown in FIG. 1, the individual base station sector's radio resources are transported to a daisy-chained network of DRUs. Each individual sector's radio resources provide coverage to an independent geographical area via the networked DRUs. FIG. 1 demonstrates how three cells, each cell comprising an independent network of 7 DRUs, provide coverage to a given geographical area. A server is utilized to control the switching function provided in the DAS network. Referring to FIG. 1 and by way of example, DAU 1 (102) receives downlink signals from BTS Sector 1 (101). DAU 1 translates the RF signals to optical signals and the optical fiber cable 103 transports the desired signals to DRU 2 (104). Optical cable 105 transports all the optical signals to DRU 3 (106). The other DRUs in the daisy chain are involved in passing the optical signals onward to DRU 1

(107). DAU 1 (102) is networked with DAU 2 (108) to allow the downlink signals from Sector 2 (109) and Sector 3 (110) to be transported to all the DRUs in Cell 1. The system's switching and routing functions enable the selection of which sectors' signals are transmitted and received by each DRU.

Figure 2:
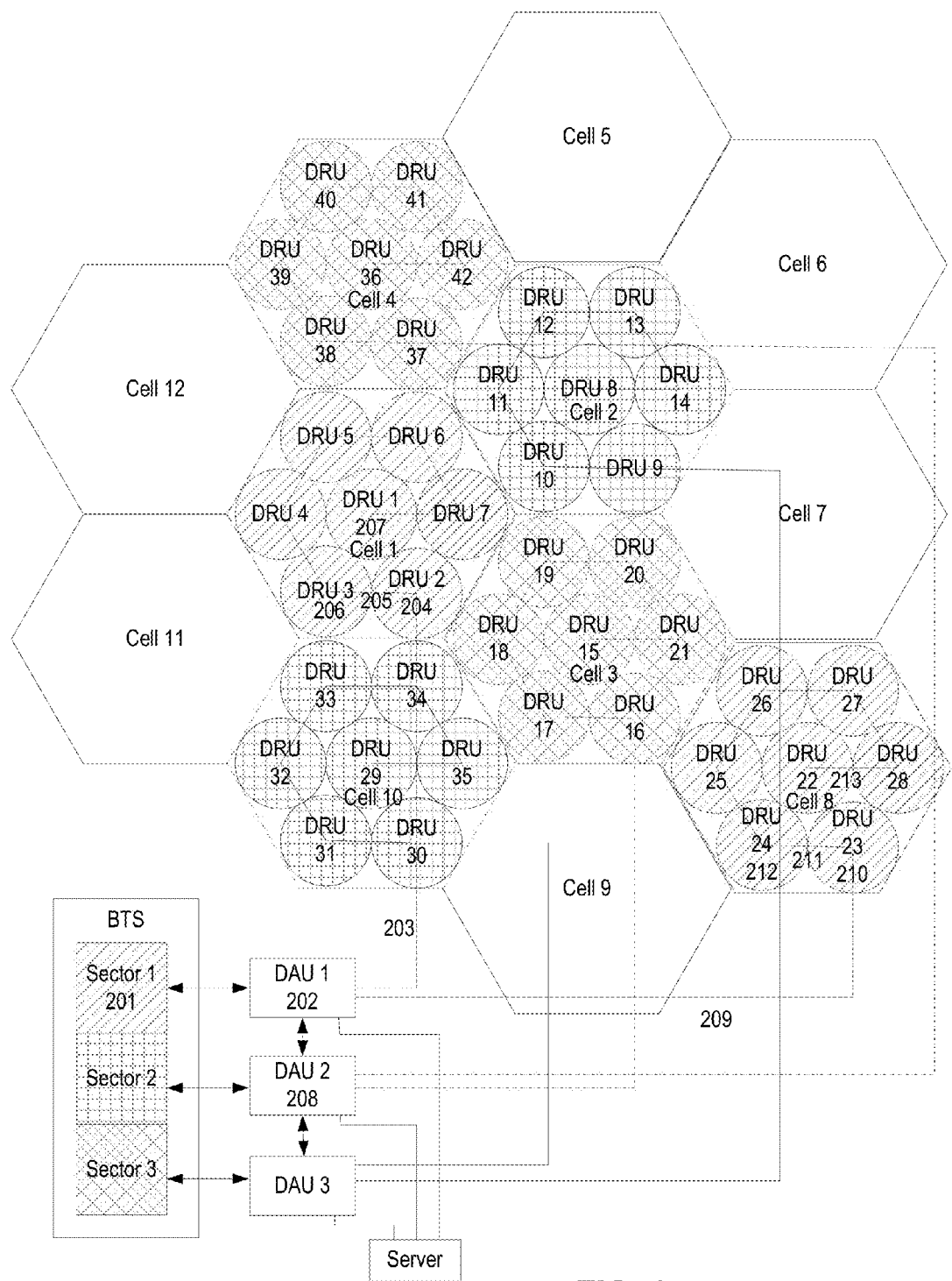
FIG. 2 is a block diagram according to one embodiment of the invention showing the basic structure for a frequency reuse pattern of N=1 and an example of the transport routing based on having a single 3 sector BTS with 3 DAUs and 7 DRUs daisy chained together for each cell.

FIG. 2 shows an embodiment illustrating how a single base station can be used to provide coverage for a larger geographical area when a frequency reuse pattern of N=1 is used. Referring to FIG. 2, cell 1 and cell 8 would share the radio resources of sector 1 of the base station. Similarly, cell 2 and cell 10 would share the radio resources of sector 2.

The DAUs control the routing of data between the base station and the DRUs. Each individual data packet is provided with a header that uniquely identifies which DRU it is associated with. The DAUs are interconnected to allow transport of data among multiple DAUs. This feature provides the unique flexibility in the DAS network to route signals between the sectors and the individual DRUs. A server is utilized to control the switching function provided in the DAS network. Referring to FIG. 2, and by way of example, DAU 1 (202) receives downlink signals from BTS 1 Sector 1 (201). DAU 1 translates the RF signals to optical signals and the optical fiber cable 203 transports the desired signals to DRU 2 (204). Optical cable 205 transports all the optical signals to DRU 3 206). The other DRUs in the daisy chain are involved in passing the optical signals onward to DRU 1 (207). DAU 1 (202) is networked with DAU 2 (208) to allow the downlink signals from Sector 2 and Sector 3 to be transported to all the DRUs in Cell 1. Optical fiber cable 209 transports the desired signals to DRU 23 (210). Optical cable 211 transports all the optical signals to DRU 24 (212). The other DRUs in the daisy chain are involved in passing the optical signals onward to DRU 22 (213).

Figure 3:
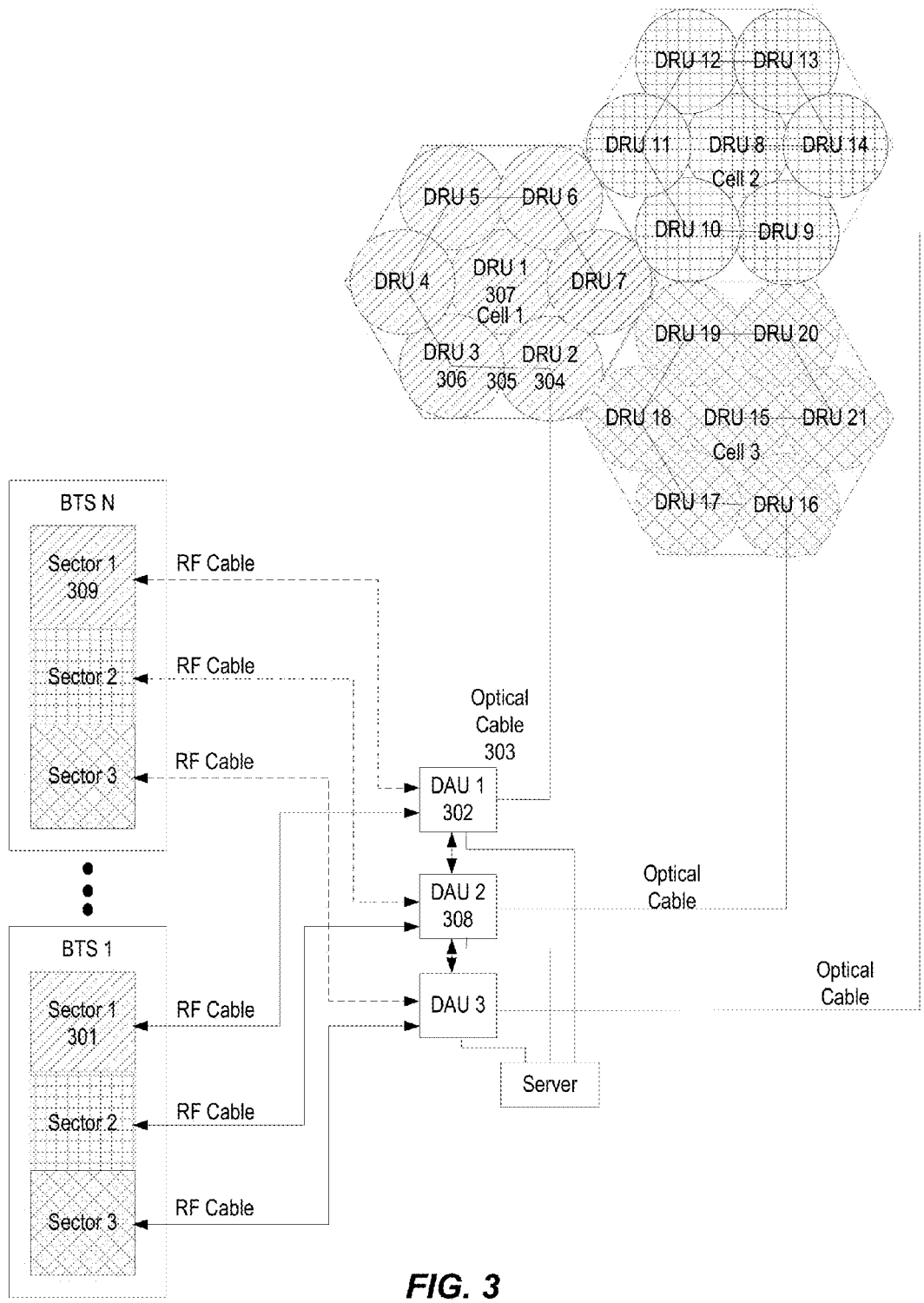
FIG. 3 is a block diagram according to one embodiment of the invention showing the basic structure and an example of the transport routing based on having multiple 3 sector BTSs with 3 DAUs and 7 DRUs daisy chained together for each cell.

FIG. 3 shows an embodiment illustrating an application employing a base station hotel where N BTSs are interconnected to serve a given geographical area. As illustrated in the figure, multiple three sector base stations are connected to a daisy chained DAS network. The base stations may represent independent wireless network operators and/or multiple standards (WCDMA, LTE, etc.) or they may represent provision of additional RF carriers. The base station signals may be combined before they are connected to a DAU, as may be the case for a Neutral Host application. Referring to FIG. 3 and by way of example, DAU 1 (302) receives downlink signals from BTS Sector 1 (301). DAU 1 translates the RF signals to optical signals and the optical fiber cable 303 transports the desired signals to DRU 2 (304). Optical cable 305 transports all the optical signals to DRU 3 (306). The other DRUs in the daisy chain are involved in passing the optical signals onward to DRU 1 (307). DAU 1 (302) is networked with DAU 2 (308) to allow the downlink signals from BTS 1 Sector 2 to be transported to all the DRUs in Cell 1. DAU 1 (302) receives downlink signals from BTS Sector N (309). DAU 1 translates the RF signals to optical signals and the optical fiber cable 303 transports the desired signals to DRU 2 (304). Optical cable 305 transports all the optical signals to DRU 3 (306). The other DRUs in the daisy chain are involved in passing the optical signals onward to DRU 1 (307). The additional base stations provide the capability to add capacity for Cell 1.

In order to efficiently utilize the limited base station resources, the network of DRUs should have the capability of re-directing their individual uplink and downlink signals to and from any of the BTS sectors. Because the DRUs data traffic has unique streams, the DAU Router has the mechanism to route the signal to different sectors.

Figure 4:
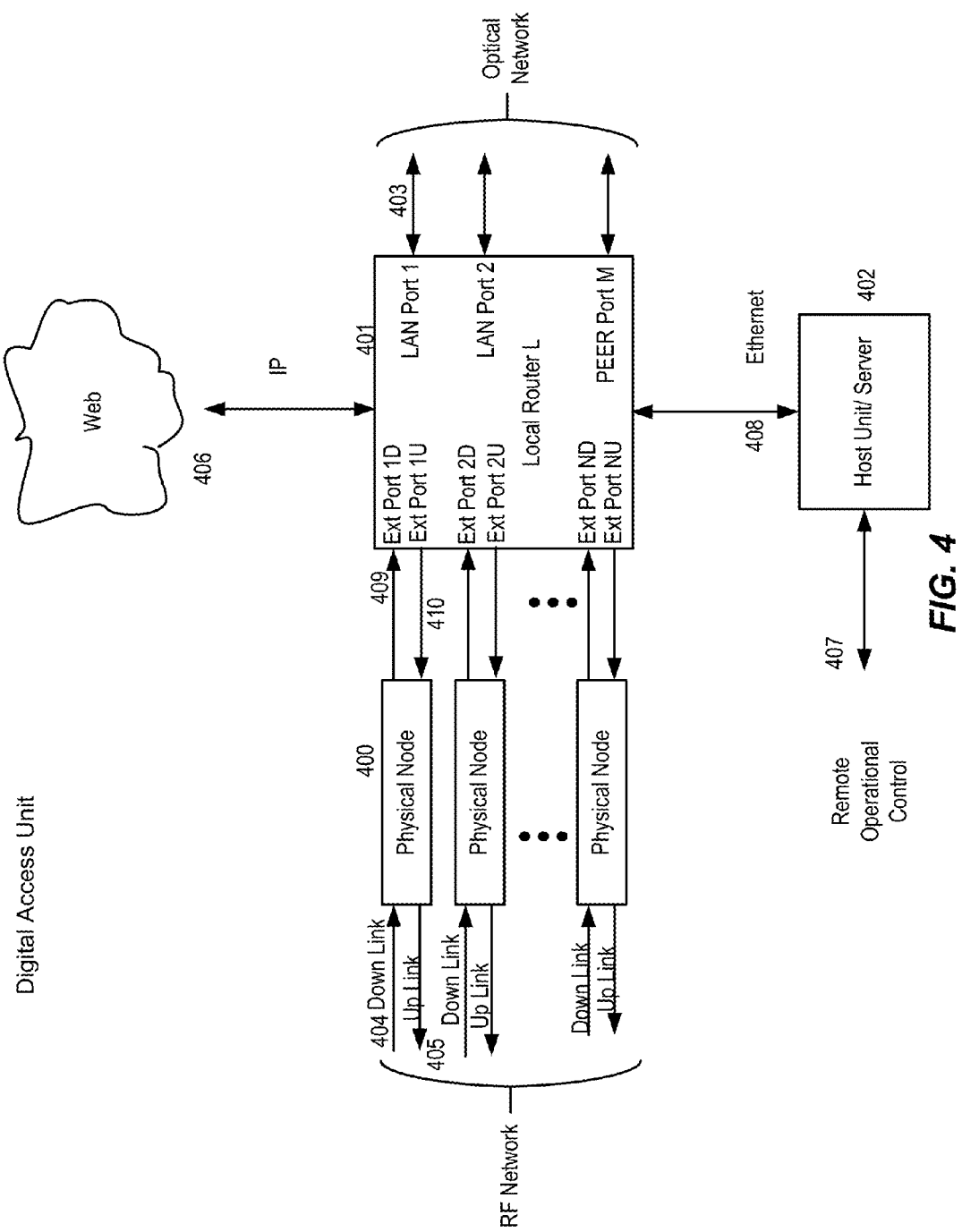
FIG. 4 is a block diagram of a Digital Access Unit (DAU), which contains Physical Nodes and a Local Router according to an embodiment of the present invention.

FIG. 4 shows the 2 primary elements in a DAU, the Physical Nodes (400) and the Local Router (401). The Physical Nodes translate the RF signals to baseband for the Downlink and from baseband to RF for the Uplink. The Local Router incorporates digital signal processing of the baseband signal and directs the traffic between the various LAN Ports, PEER Ports and the External Ports. The physical nodes connect to the BTS at radio frequencies (RF). The physical nodes can be used for different operators, different frequency bands, different channels, or the like. The physical nodes can combine the downlink and uplink signals via a duplexer or they can keep them separate, as would be the case for a simplex configuration.

FIG. 4 shows an embodiment whereby the physical nodes have separate outputs for the uplinks (405) and separate inputs for the downlink paths (404). The physical node translates the signals from RF to baseband for the downlink path and from baseband to RF for the uplink path. The physical nodes are connected to a Local Router via external ports (409,410)). The router incorporates digital signal processing of the baseband signal and directs the uplink data stream from the LAN and PEER ports to the selected External U ports. Similarly, the router incorporates digital signal processing of the baseband signal and directs the downlink data stream from the External D ports to the selected LAN and PEER ports.

In one embodiment, the LAN and PEER ports are connected via an optical fiber to a network of DAUs and DRUs. The interface between the LAN and PEER ports and the optical fiber can comprise a Framer/Deframer, Serializer/Deserializer and an Optical Transmitter/Receiver. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU can also connect directly to the Remote Operational Control center (407) via the Ethernet port.

Figure 5:
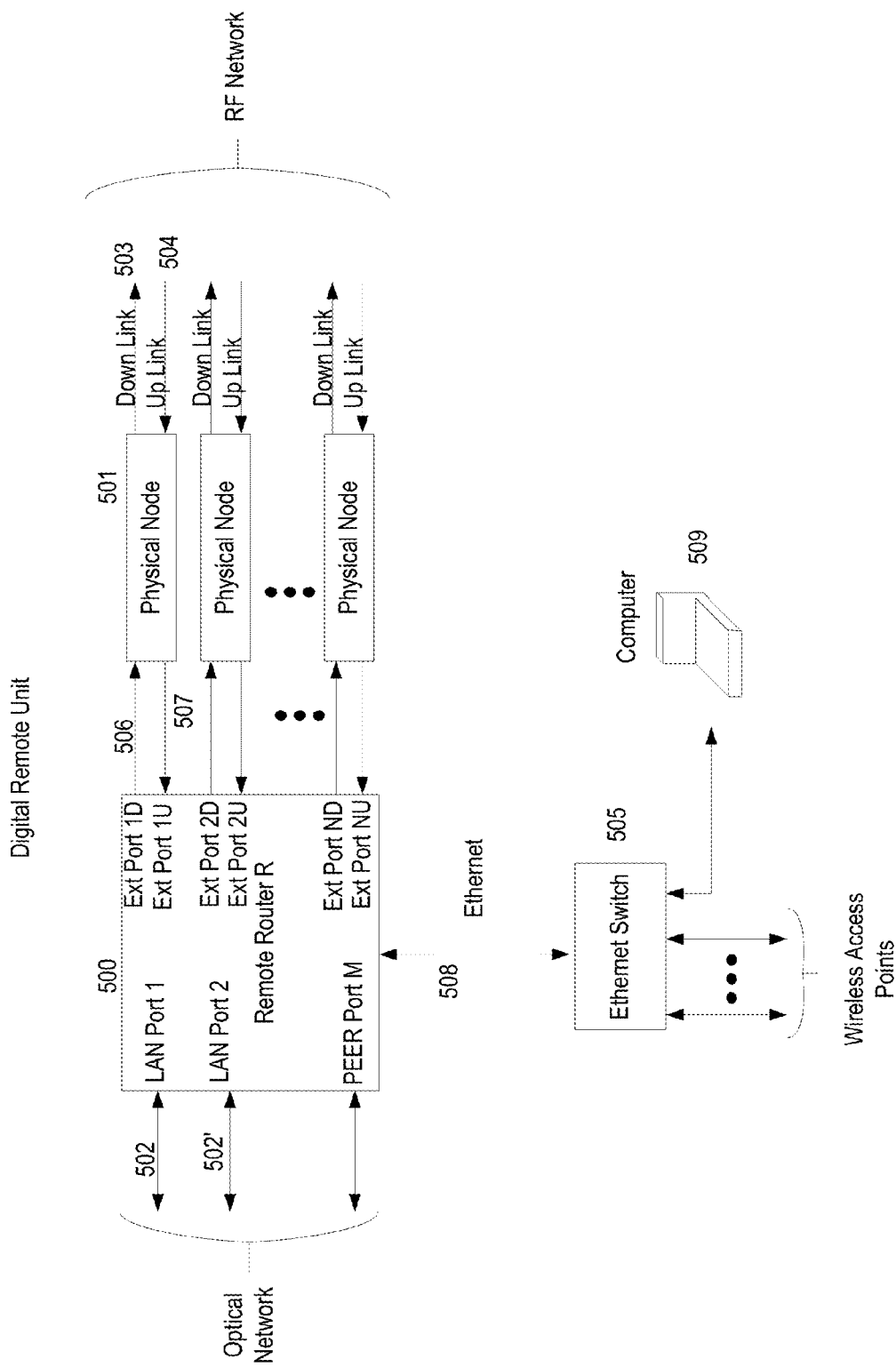
FIG. 5 is a block diagram of a Digital Remote Unit (DRU) according to an embodiment of the present invention.

FIG. 5 shows the 2 primary elements in a DRU, the Physical Nodes (501) and the Remote Router (500). The DRU includes both a Remote Router and Physical Nodes. The Remote Router directs the traffic between the LAN ports, External Ports and PEER Ports. The physical nodes connect to the BTS at radio frequencies (RF). The physical nodes can be used for different operators, different frequency bands, different channels, etc. FIG. 5 shows an embodiment whereby the physical nodes have separate inputs for the uplinks (504) and separate outputs for the downlink paths (503). The physical node translates the signals from RF to baseband for the uplink path and from baseband to RF for the downlink path. The physical nodes are connected to a Remote Router via external ports (506,507). The interface between the LAN and PEER ports and the optical fiber can comprise a Framer/Deframer, Serializer/Deserializer and an Optical Transmitter/Receiver. The router directs the downlink data stream from the LAN and PEER ports to the selected External D ports. Similarly, the router directs the uplink data stream from the External U ports to the selected LAN and PEER ports. The DRU also contains an Ethernet Switch (505) so that a remote computer or wireless access points can connect to the internet.

Figure 6:
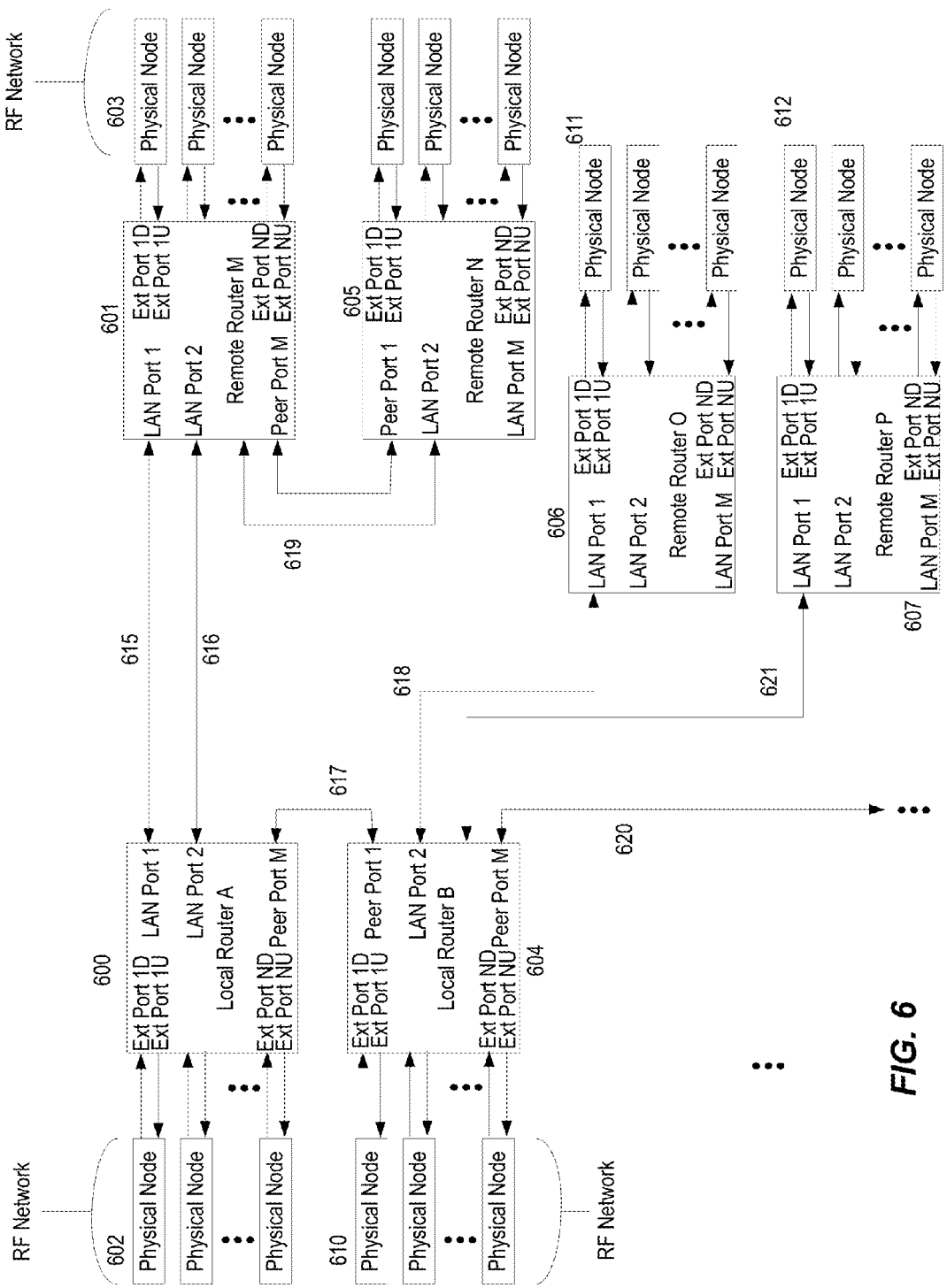
FIG. 6 depicts a typical topology where multiple Local Routers are interconnected with multiple Remote Routers according to an embodiment of the present invention.
Figure 6:
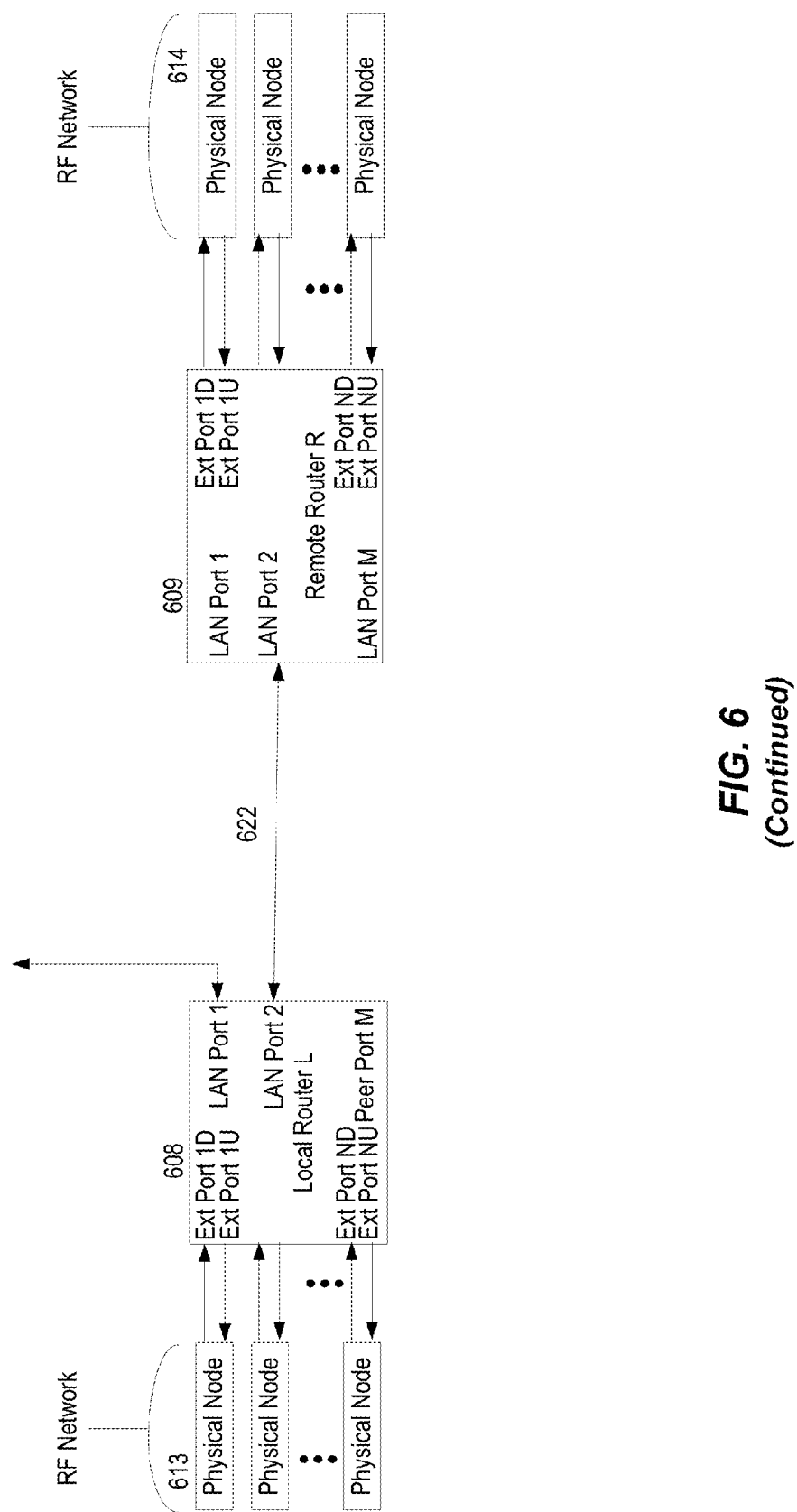

FIG. 6 depicts a DAS network that includes multiple DAUs and multiple DRUs and illustrates the RF Router Topology. The Local Routers are shown in a Daisy Chain configuration. The Remote Routers are shown in a star and daisy chain configuration. The local routers in the DAUs can be interconnected via a PEER port. The Local routers can connect to the remote routers in the DRUs via an optical or copper connection. The interface between the LAN and PEER ports and the optical fiber can comprise a Framer/Deframer, Serializer/Deserializer and an Optical Transmitter/Receiver. The remote routers in the DRUs can be connected in a daisy chain configuration with other DRUs or they may be connected with a local router via a star configuration. The PEER ports in a DAU are used when there is no direct connection between a physical node connected to a local router's DAU and a physical node connected to a remote router DRU. PEER ports at the DRU are used for daisy chaining between two or more DRUs.

Figure 7:
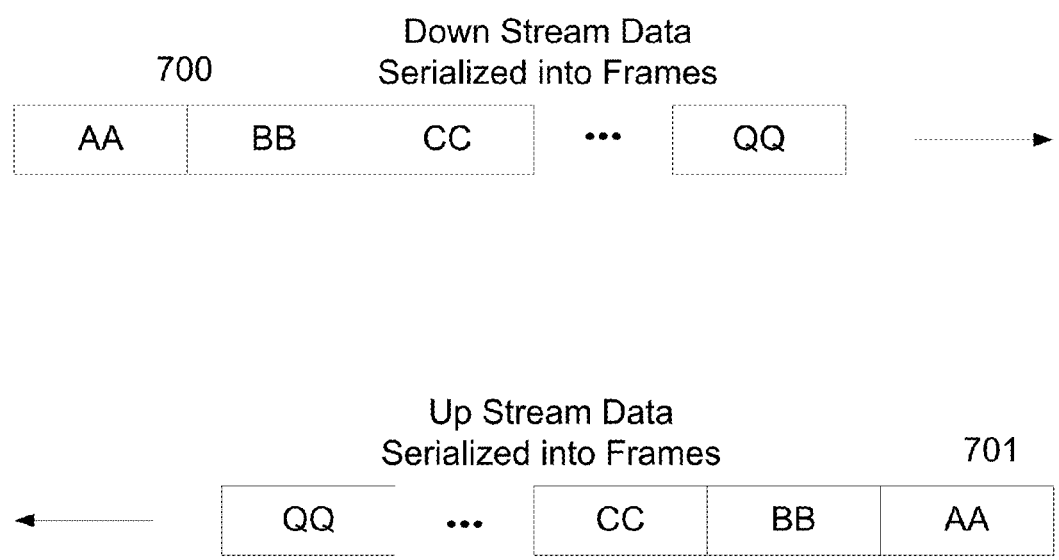
FIG. 7 shows an embodiment of the serialization of the data frames for the optical interconnections between the LAN and PEER ports according to an embodiment of the present invention.

FIG. 7 shows how the data stream (e.g., TDM data frames) of the downlink (700) and uplink (701) can be serialized for transportation between DAUs, DRUs and between DAU to DRU. In one embodiment the data is streamed using a protocol such as CPRI.

Figure 8:
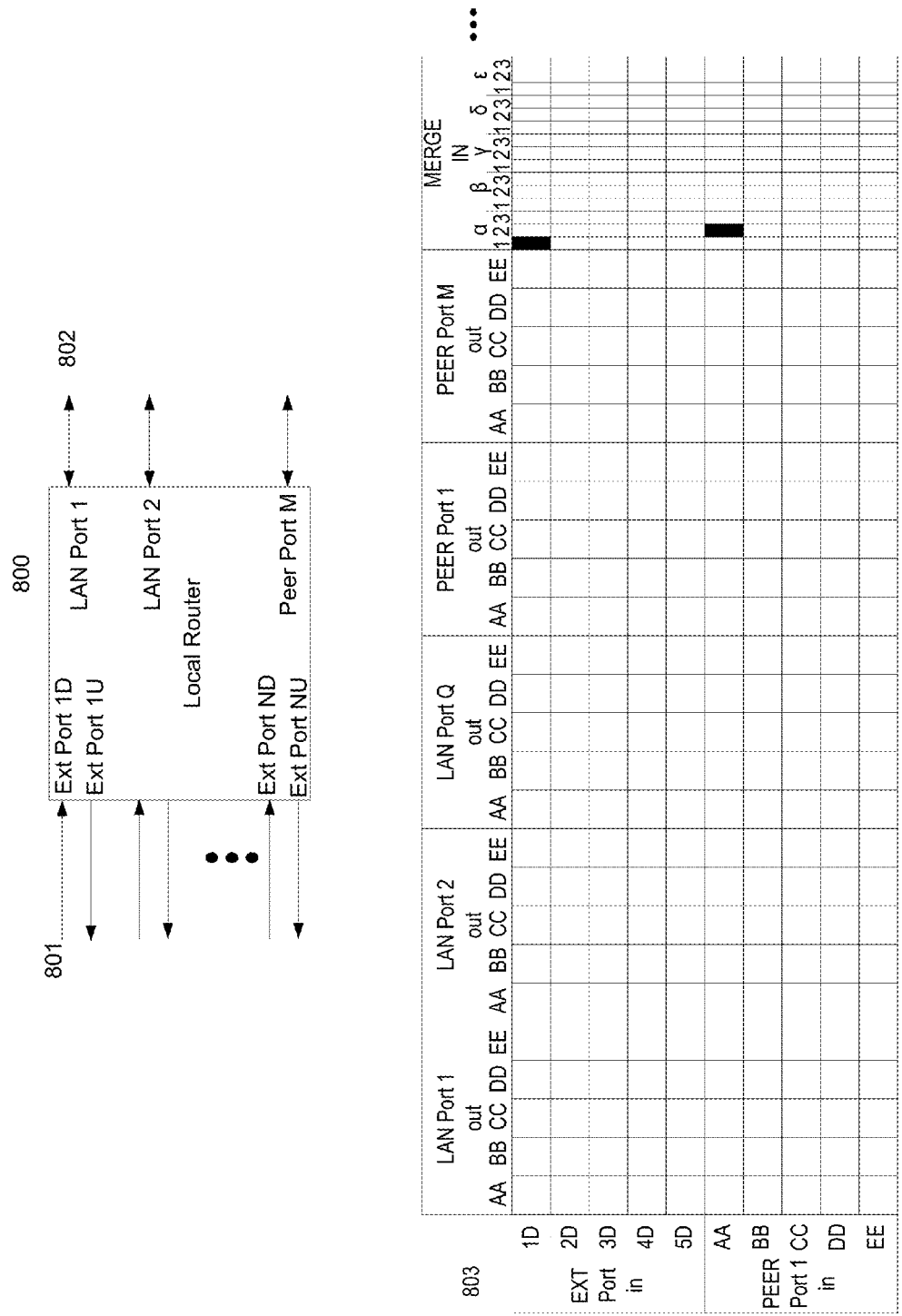
FIG. 8 shows an embodiment of the Local Router table for the downlink signals according to an embodiment of the present invention.
Figure 8:
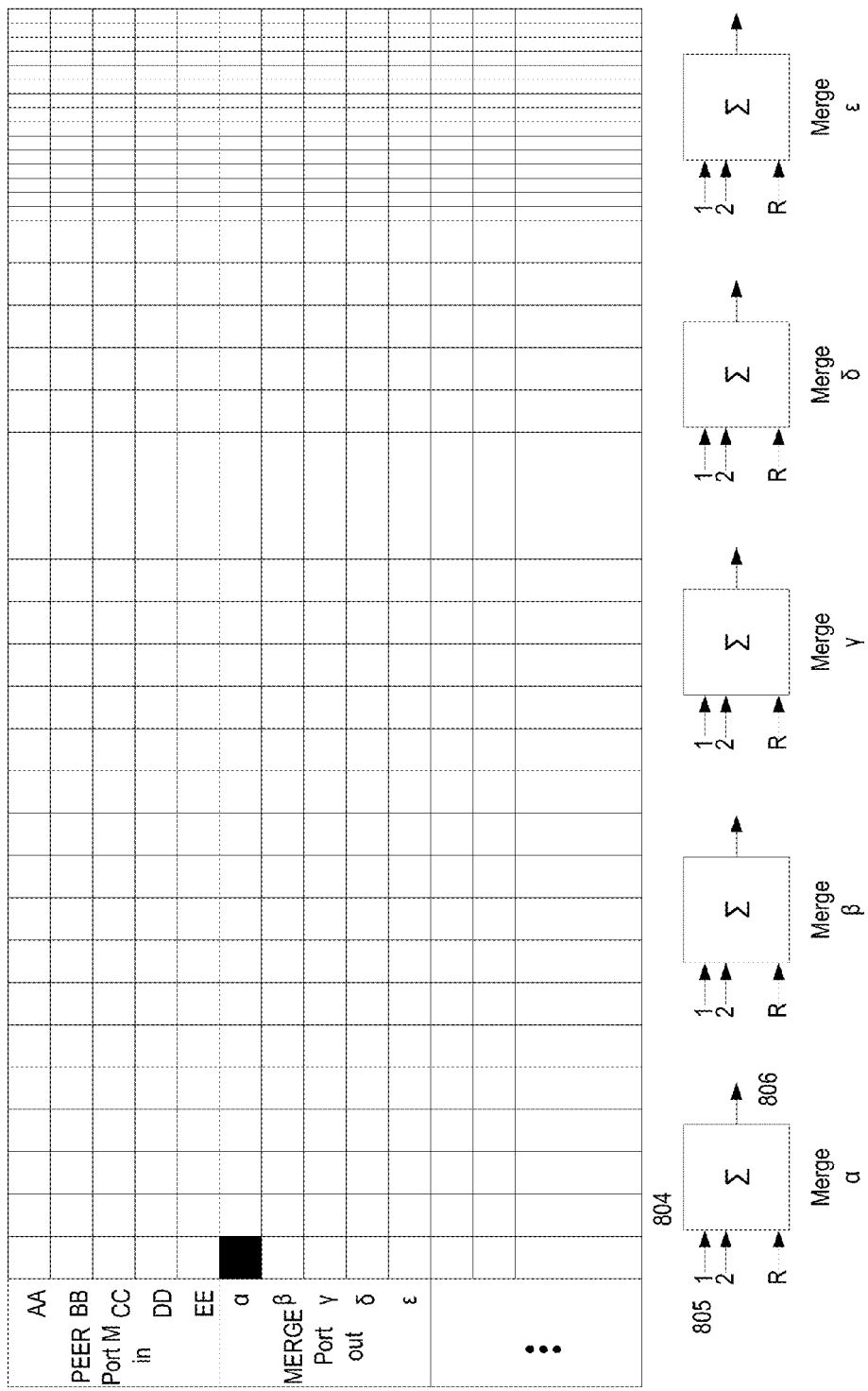

FIG. 8 provides the details of one embodiment of the Local Routers. This figure represents a down stream local router table. The local router includes External Downlink and Uplink ports. It also includes LAN ports and PEER ports. The LAN ports are used to connect with DRUs on the network. The PEER ports are used to connect to other DAUs on the network. The Local Router Downlink table is used to establish the routing of the data traffic between the inputs and the outputs. The blacked out squares indicate a routing path. As an example, in FIG. 8 the External downlink input port 1D is routed to the MERGE input 1 of Merge block α and the PEER Port 1 input is routed to MERGE input 2 of Merge block α. The MERGE Port output of block α is sent to LAN Port 1 stream AA.

FIG. 8 shows one embodiment where there are 5 Merge blocks and 5 streams. The Local Router table would be configured for a given network of DAUs and DRUs. The router table demonstrates the routing of the Downlink signals between the External D ports to the LAN/PEER ports. The table can easily be extended to additional Merge blocks, additional External Inputs, additional LAN ports and additional PEER ports. The MERGE blocks can also have multiple inputs. The table can have multiple blacked out squares within a row but can have only one blacked out square within a column.

Figure 9:
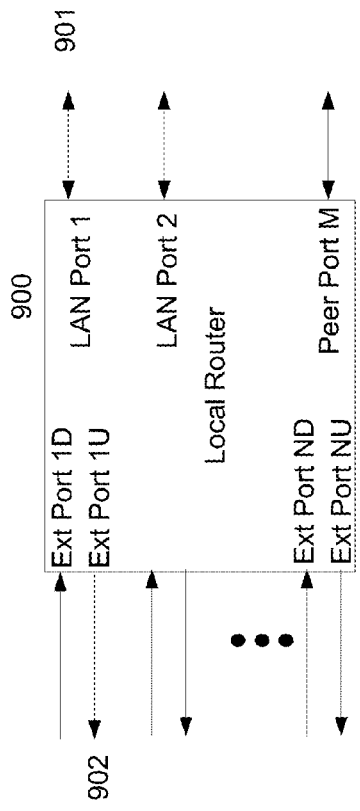
FIG. 9 shows an embodiment of the Local Router table for the Uplink signals according to an embodiment of the present invention.
Figure 9:
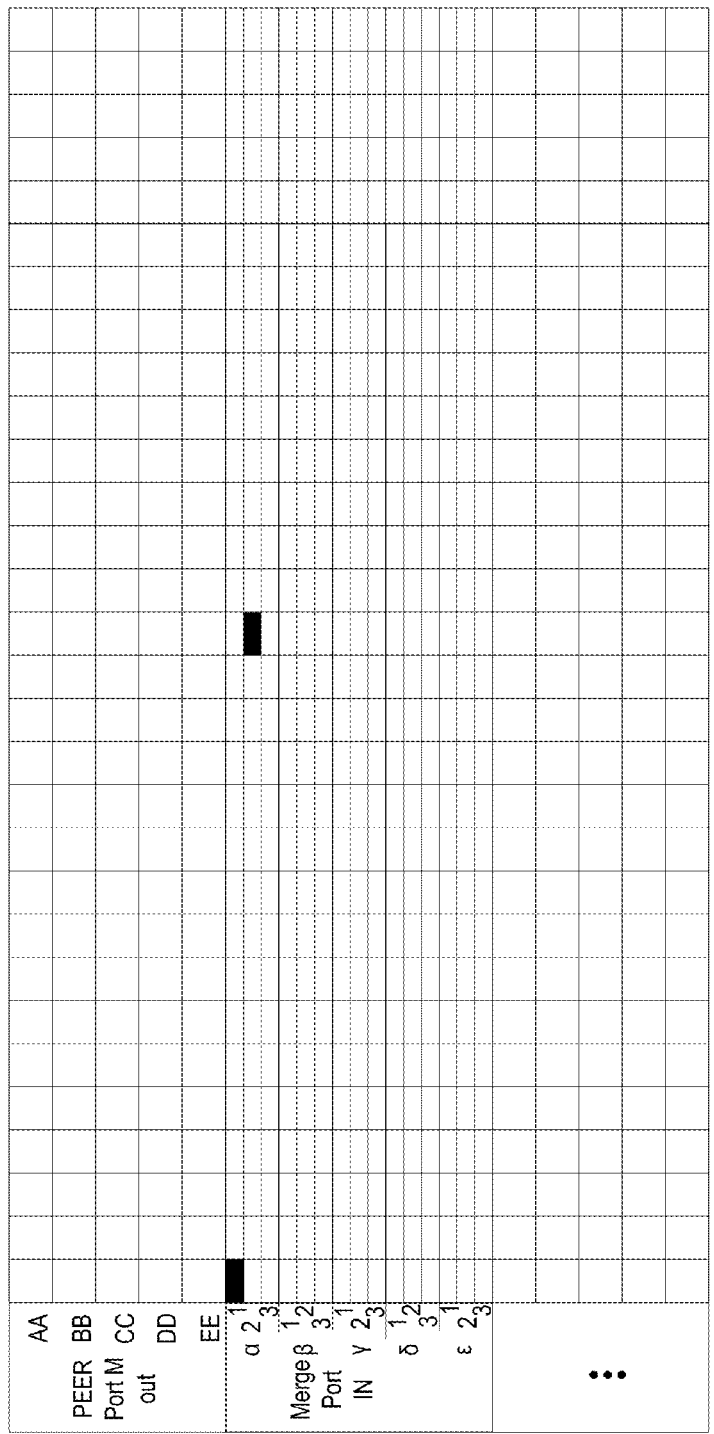

FIG. 9 provides the details of one embodiment of the Local Routers. This figure represents an up stream local router table. The local router includes External Downlink and Uplink ports. It also includes LAN ports and PEER ports. The LAN ports are used to connect with DRUs on the network. The PEER ports are used to connect to other DAUs on the network. The Local Router Uplink table is used to establish the routing of the data traffic between the inputs and the outputs. The blacked out squares indicate a routing path. As an example, in FIG. 9 the LAN port 1 input of stream AA is routed to the MERGE input 1 of Merge block α. The PEER Port 1 input of stream AA is routed to Merge input 2 of Merge block α. The output of Merge block α is routed to external port 1U.

FIG. 9 shows an embodiment of the Local Router table for the Uplink signals. The Local Router table would be configured for a given network of DAUs and DRUs. The router table demonstrates the routing of the Uplink signals between the LAN/PEER ports and the External U ports. FIG. 9 shows one embodiment where there are 5 Merge blocks and 5 streams. The table can easily be extended to additional Merge blocks, additional External Inputs, additional LAN ports and additional PEER ports. The MERGE blocks can also have multiple inputs. The table can have multiple blacked out squares within a column but can have only one blacked out square within a row.

Figure 10:
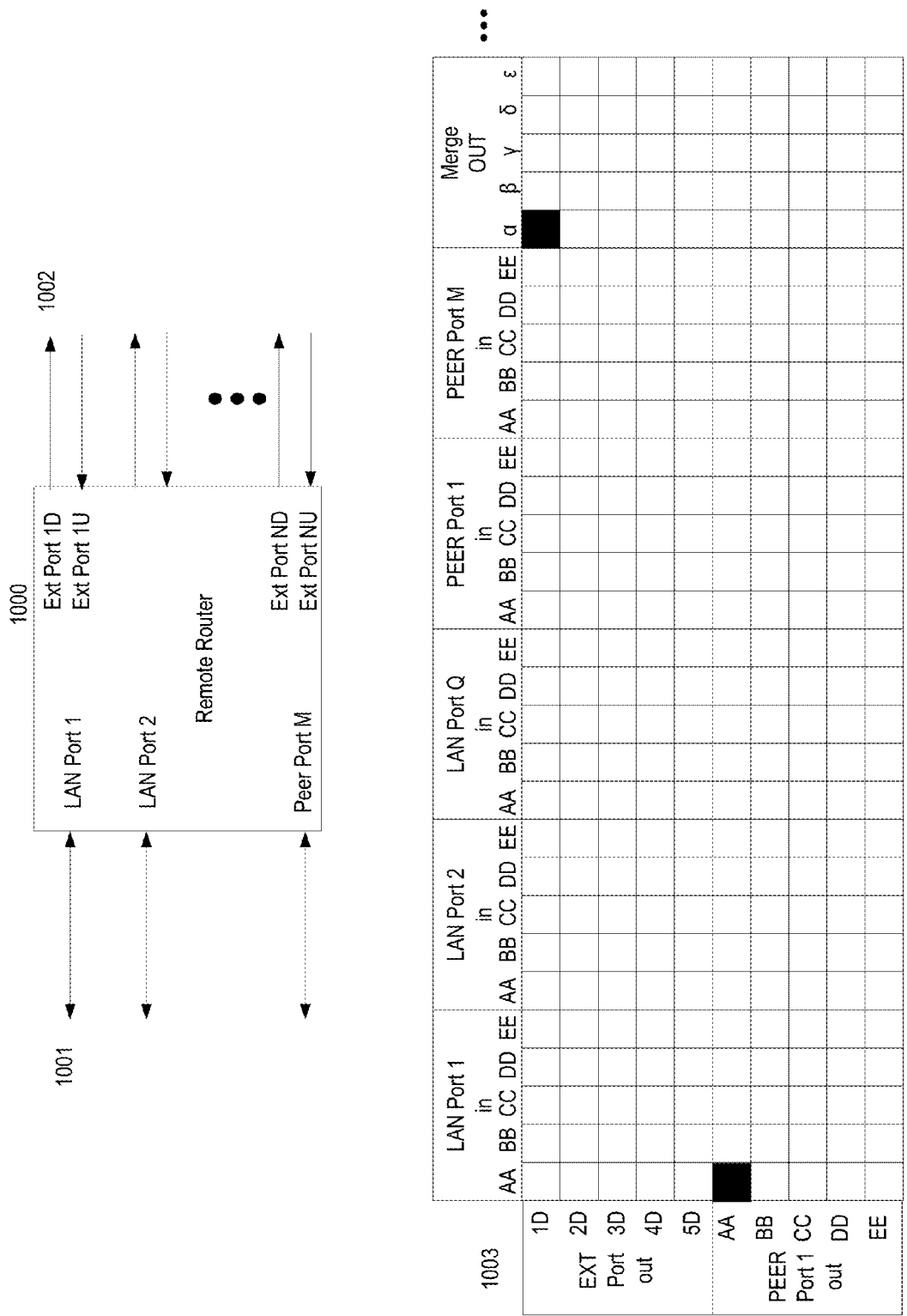
FIG. 10 shows an embodiment of the Remote Router table for the downlink signals according to an embodiment of the present invention.
Figure 10:
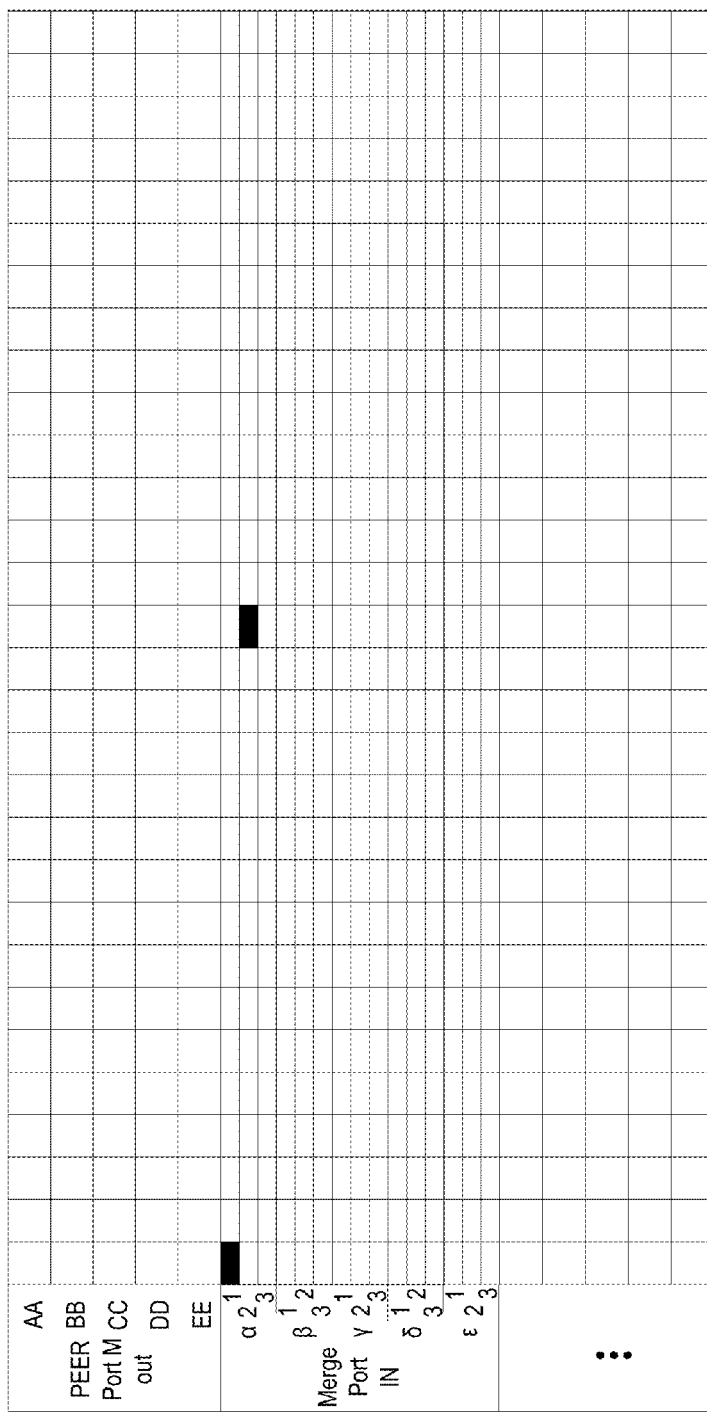
Figure 10:
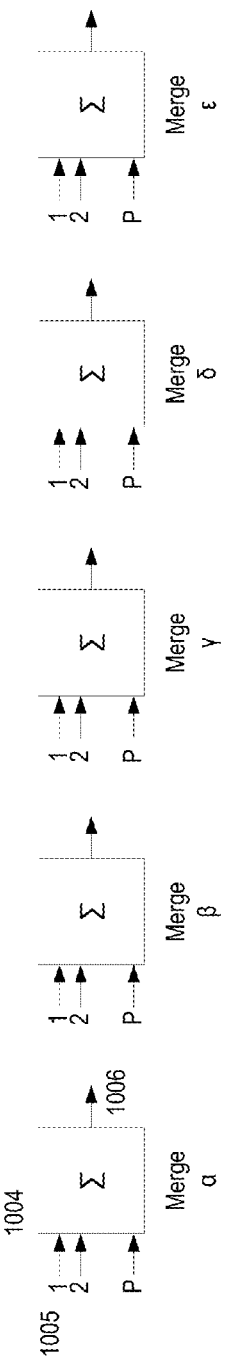

FIG. 10 provides the details of one embodiment of the Remote Routers. This figure represents a down stream remote router table. The remote router includes External Downlink and Uplink ports. It also includes LAN ports and PEER ports. The LAN ports are used to connect with DAUs on the network. The PEER ports are used to connect to other DRUs on the network. The Remote Router Downlink table is used to establish the routing of the data traffic between the inputs and the outputs. The blacked out squares indicate a routing path. As an example, in FIG. 10 the LAN port 1 input of stream AA is routed to the MERGE input 1 of Merge block α. The PEER Port 1 input of stream AA is routed to Merge input 2 of Merge block α. The output of Merge block α is routed to external port 1D.

FIG. 10 shows one embodiment where there are 5 Merge blocks and 5 streams. The table can easily be extended to additional Merge blocks, additional External Inputs, additional LAN ports and additional PEER ports. The MERGE blocks can also have multiple inputs. The table can have multiple blacked out squares within a column but can have only one blacked out square within a row.

FIG. 10 shows an embodiment of the Remote Router table for the downlink signals. The Remote Router table would be configured for a given network of DAUs and DRUs. The router table demonstrates the routing of the Downlink signals between the LAN/PEER ports and the External D ports.

Figure 11:
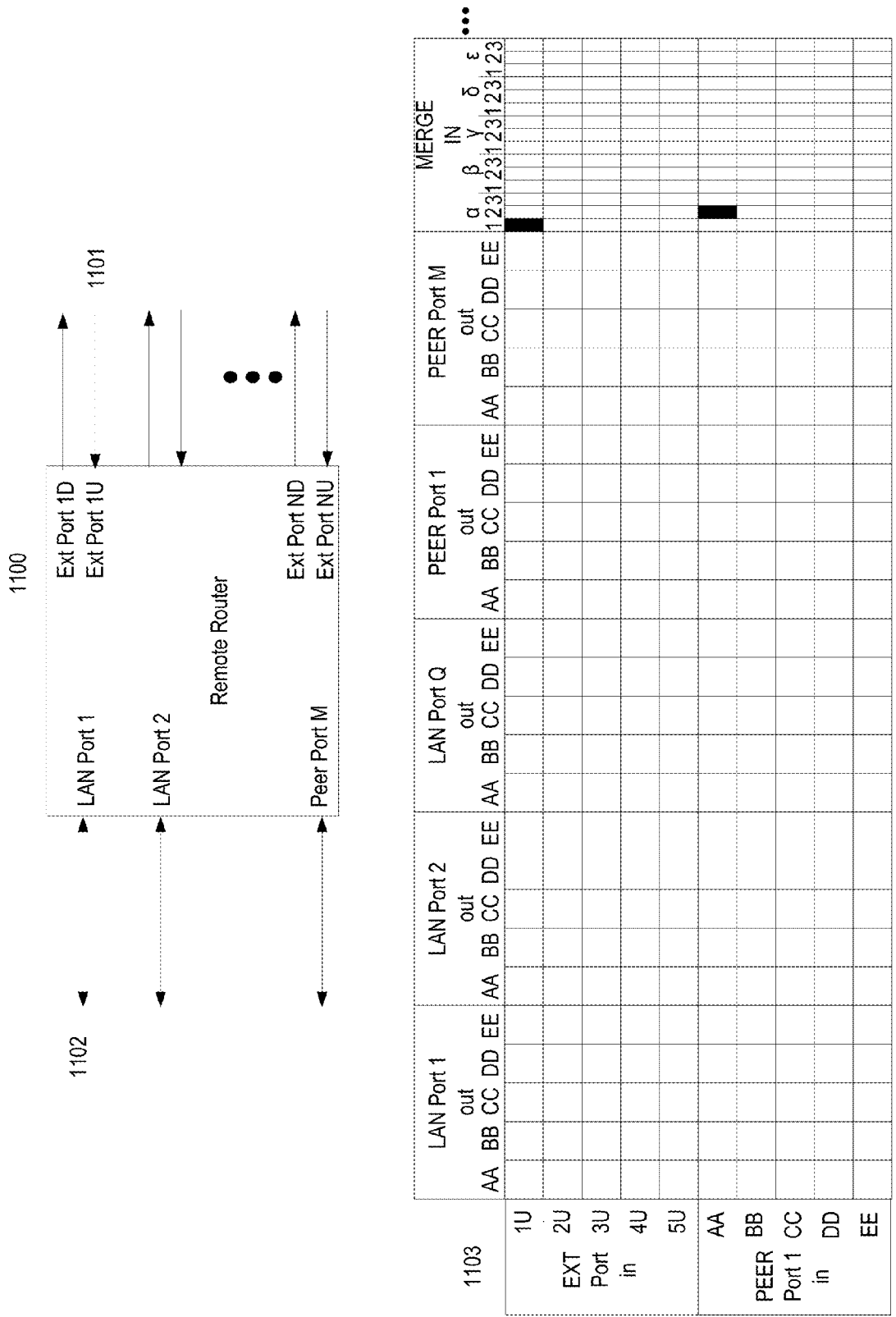
FIG. 11 shows an embodiment of the Remote Router table for the uplink signals according to an embodiment of the present invention.
Figure 11:
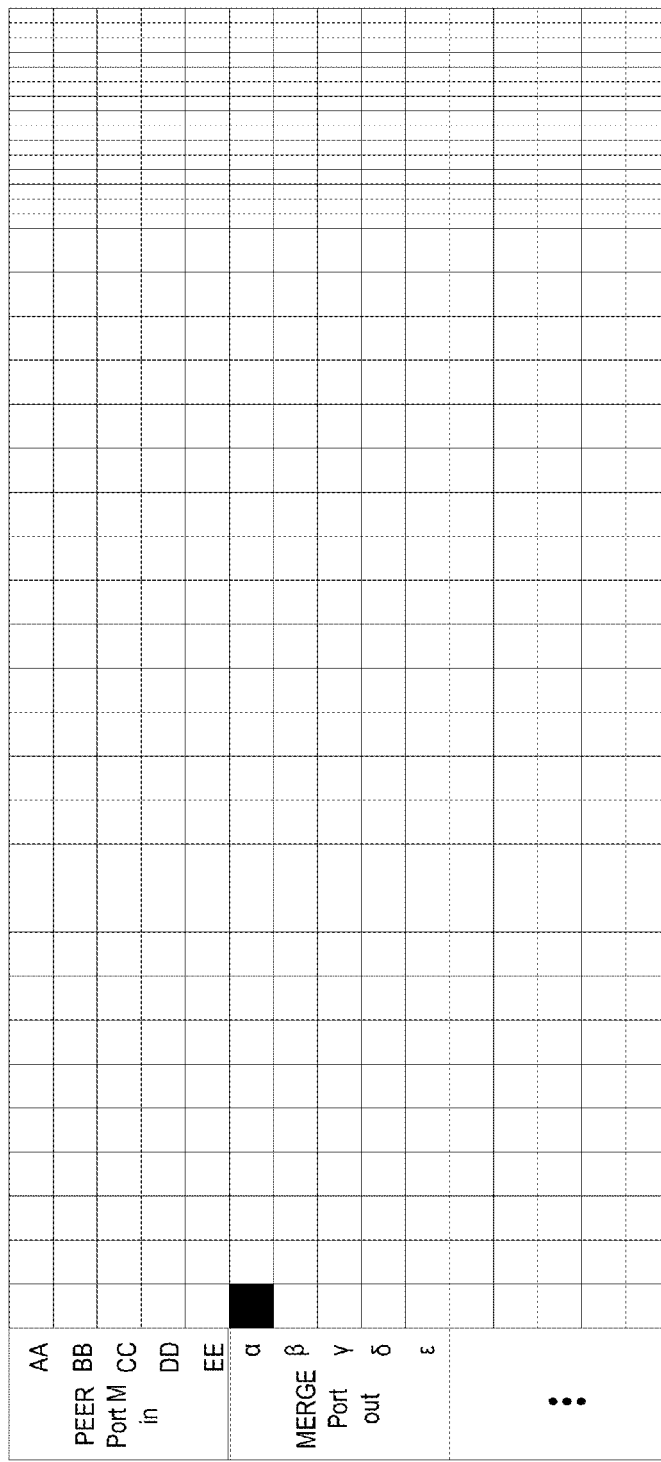
Figure 11:
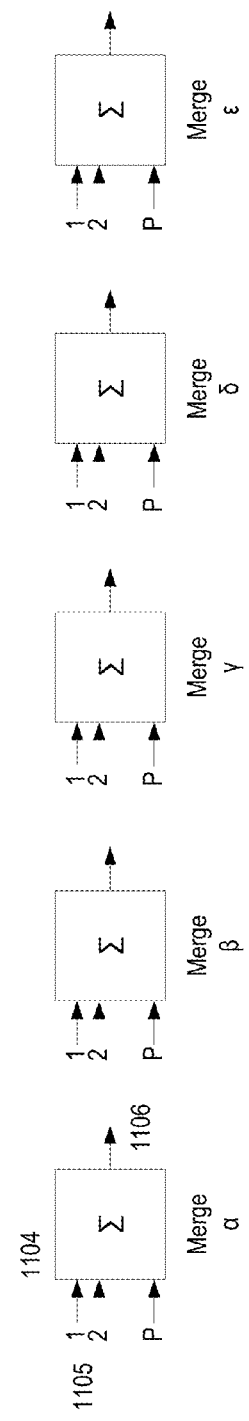

FIG. 11 provides the details of one embodiment of the Remote Routers. This figure represents an up stream remote router table. FIG. 11 shows an embodiment of the Remote Router table for the uplink signals. The Remote Router table would be configured for a given network of DAUs and DRUs. The router table demonstrates the routing of the Uplink signals between the External U ports and the LAN/PEER Ports. The remote router includes External Downlink and Uplink ports. It also includes LAN ports and PEER ports. The LAN ports are used to connect with DAUs on the network. The PEER ports are used to connect to other DRUs on the network. The Remote Router Uplink table is used to establish the routing of the data traffic between the inputs and the outputs. The blacked out squares indicate a routing path. As an example, in FIG. 11 the External uplink input port 1U is routed to the MERGE input 1 of Merge block α and the PEER Port 1 input is routed to MERGE input 2 of Merge block α. The MERGE Port output of block α is sent to LAN Port 1 stream AA.

FIG. 11 shows one embodiment where there are 5 Merge blocks and 5 streams. The table can easily be extended to additional Merge blocks, additional External Inputs, additional LAN ports and additional PEER ports. The MERGE blocks can also have multiple inputs. The table can have multiple blacked out squares within a row but can have only one blacked out square within a column.

Figure 12:
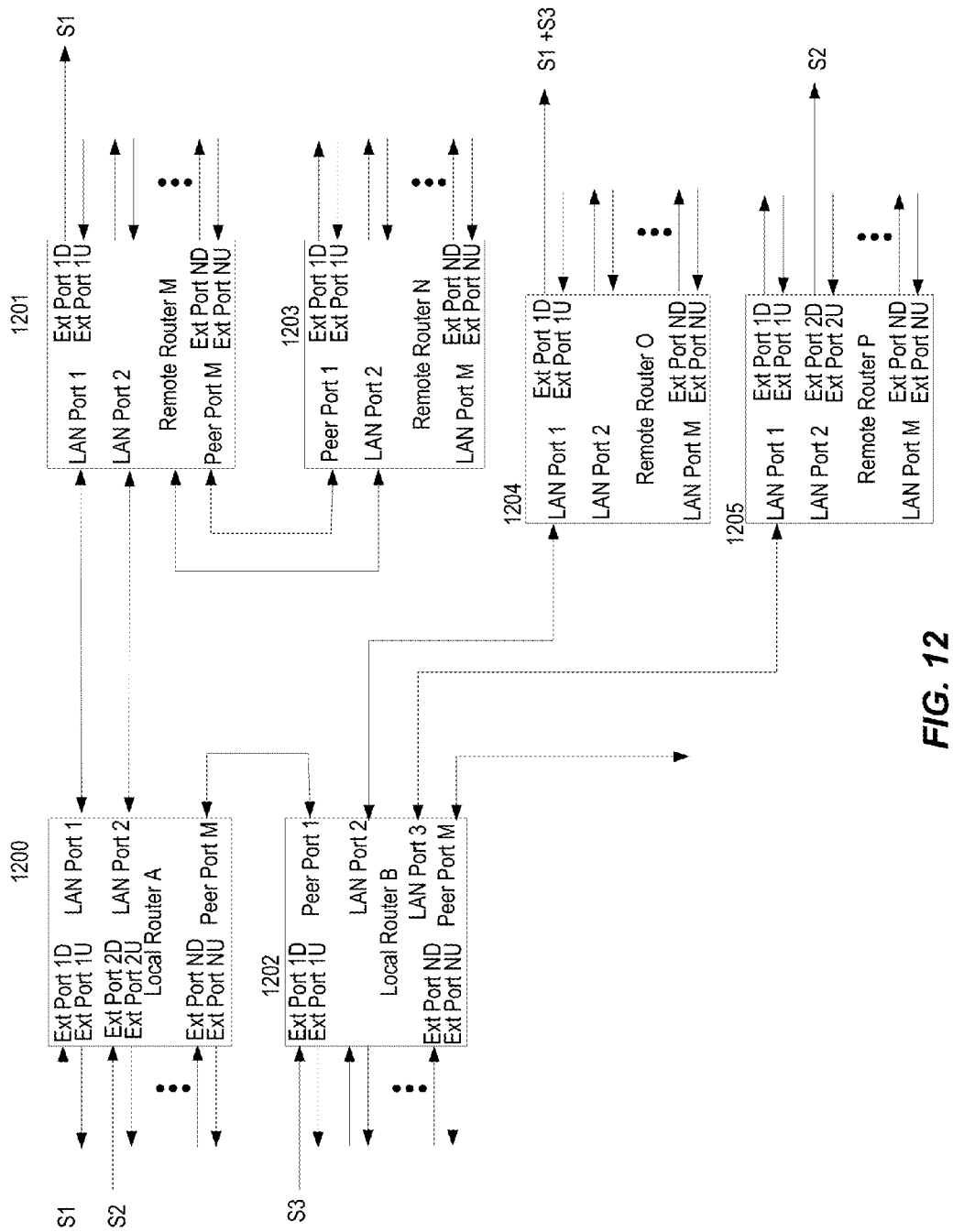
FIG. 12 shows 3 examples of routing Downlink signals over the network of DAUs and DRUs according to an embodiment of the present invention.

FIG. 12 provides some examples of the routing of traffic through one embodiment of the network. In the tables, operational code is used to configure the local and remote routers. FIG. 12 shows 3 examples of routing Downlink signals over the network of DAUs and DRUs. The tables demonstrate an embodiment of an operational code that could be used to set each of the Router tables.

In table 1, the downlink data input S1 at External Port 1D of Local Router A is routed to the External Port 1D of Remote router M. LAN Port 1 is used to stream the data between the Local router A and the Remote router M.

In table 2, the downlink data input S2 at External Port 2D of Local Router A is routed to the External Port 2D of Remote router P. PEER Port M of Local router A is used to stream the downlink signal S2 to PEER port 1 of Local router B. LAN Port 3, stream BB is used to communicate with LAN port 1 of Remote router P. The input of LAN Port 1 stream BB is routed to External Port 2D in Remote router P.

In table 3, the downlink data input S1 at External Port 1D of Local Router A is routed to the PEER Port M stream AA. The output from PEER Port M, stream AA of Local Router A is input to PEER Port 1 of Local Router B. PEER Port 1, stream AA of Local Router B is sent to input 1 of Merge block α. The downlink data input S3 at External Port 1D of Local Router B is routed to input 2 of Merge block α. The output of Merge block α is routed to LAN Port 2, stream AA of Local router B. LAN Port 2, of Local Router B transports data to LAN Port 1 of Remote Router O. The input data from LAN Port 2, of Remote Router O is routed to External Port 1D.

Figure 13:
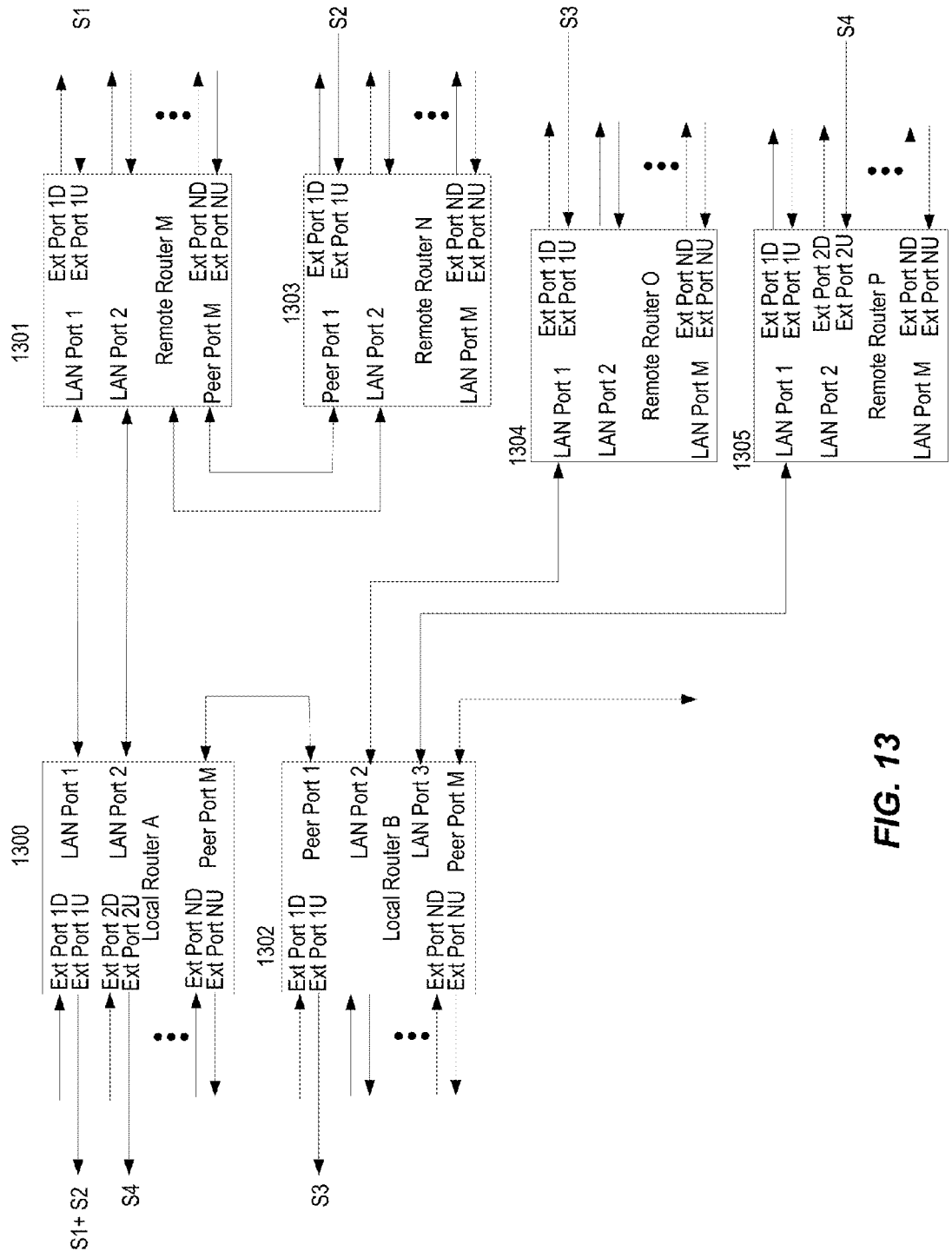
FIG. 13 shows 3 examples of routing Uplink signals over the network of DAUs and DRUs according to an embodiment of the present invention.

FIG. 13 provides some examples of the routing of traffic through one embodiment of the network. In the tables, operational code is used to configure the local and remote routers. FIG. 13 shows 3 examples of routing Uplink signals over the network of DAUs and DRUs. The tables demonstrate an embodiment of an operational code that could be used to set each of the Router tables.

In table 1, the Uplink data input S3 at External Port 1U of Remote Router O is routed to LAN Port 1. LAN Port 1, stream AA of Remote Router O is used to stream the data between LAN Port 1, stream AA of Remote router O and LAN Port 2, Stream AA of Local router B. The input to LAN Port 2, stream AA of Local router B is routed to external Port 1U.

In table 2, the uplink data input S4 at External Port 2U of Remote Router P is routed to LAN Port 1, stream BB of Remote router P. LAN Port 1, stream BB of Remote router P is used to stream the uplink signal S4 to LAN port 3, stream BB of Local router B. LAN Port 3, stream BB is routed to PEER port 1, stream BB of Local router B. PEER Port 1, stream BB of Local router B transports data to LAN Port M, stream BB of Local router A. The input of PEER Port 1 stream BB is routed to External Port 2U in Local router A.

In table 3, the uplink data input S2 at External Port 1U of Remote Router N is routed to the PEER Port 1, stream AA of Remote router N. The output from PEER Port 1, stream AA of Remote Router N is input to PEER Port M of Remote Router M. PEER Port M, stream AA of Remote Router M is sent to input 1 of Merge block α. The uplink data input S1 at External Port 1U of Remote Router M is routed to input 2 of Merge block α. The output of Merge block α is routed to LAN Port 1, stream AA of Remote router M. LAN Port 1, of Remote Router M transports data to LAN Port 1 of Local Router A. The input data from LAN Port 1, of Local Router A is routed to External Port 1U of Local router A.

Figure 14:
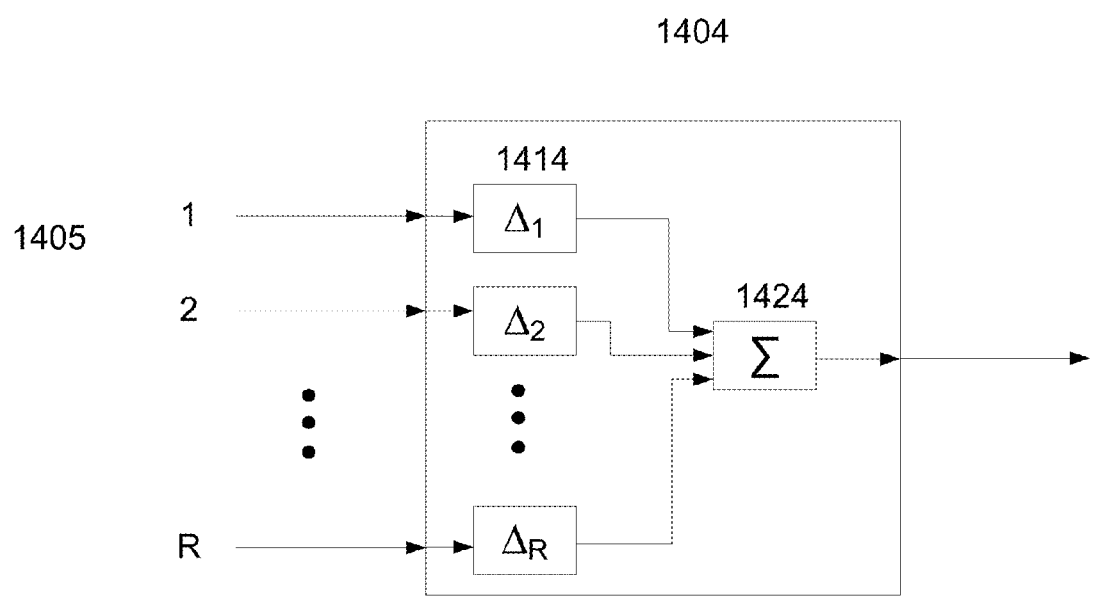
FIG. 14 shows an embodiment of the local router delay compensation merge unit.

FIG. 14 shows one embodiment of the local router merge unit. The local router consists of delay blocks that compensate for fiber length as well as serializer/deserializer delays between a DAU and any remote DRUs connected to that DAU. The delay blocks (1414) insure that the multiple DRUs transmit signals synchronously for the downlink path and receive signals synchronously for the uplink paths. The delays are calibrated at the provisioning of the DAS network in an embodiment. One embodiment of delay calibration is the use of a loop back measurement. A signal is transmitted from a DAU to a selected DRU, the DRU receives and then directly retransmits the signal back to the original DAU. The time delay of the complete loop is measured and ½ of the measured delay is used for delay compensation in the Merge Unit (1404). The same delay can be used for the downlink as well as the uplink paths. Multiple delays can be used for the different bands if a high level of delay compensation accuracy is required. In one embodiment, the delay compensation may be incorporated in the local router merge units and/or in the remote router merge units.

As illustrated in FIG. 14, signals 1-R (e.g., signals 1-6 for a DAU with 6 inputs) are processed and summed in local router merge unit 1404. Thus, embodiments of the present invention enable, as described more fully herein, non-simultaneous bi-directional distribution. To provide non-simultaneous distribution, delay blocks $\Delta_1$-$\Delta_R$ 1414 apply a predetermined delay to signals 1-R, respectively. It should be noted that in a simultaneous distribution system, the delay blocks would either not be present (no delay) or introduce a single, uniform value to each of the signals. Because signals from the DAUs are transmitted to the DRUs using, in general, differing length fiber optic cable and may undergo different electronic delays, the signals 1=R are characterized by differing delay values when they reach the various DRUs. Accordingly, embodiments of the present invention utilize a calibration process in which a signal is sent from an originating DAU to a specific DRU, the signal is routed back to the originating DAU, and the time delay associated with the specific DRU is measured. For multiple DRUs connected to a DAU, the time delay for each DRU connected to that DAU is measured. In one implementation, the longest time delay is utilized as a reference, with the other DRUs being time shifted with respect to the reference.

Referring to FIG. 1, DAU 1 (102) is connected through optical cable 103 to DRUJ through DRU7. Because of the spatial separation of the DRUs connected on the daisy chain, each DRU will have a different delay with respect to DAU 1. In an embodiment, the delay is incorporated at each DRU. In this embodiment, when the signal from DRU1 is received at DRU7, the signals are summed and transmitted toward the DAU. After calibration, the time delays are stored in a memory, which may be shared between or duplicated on the various DRUs. As elements of the system are moved, recalibration can be performed as appropriate. One of ordinary skill in the art would recognize many variations, modifications, and alternatives.

Figure 15:
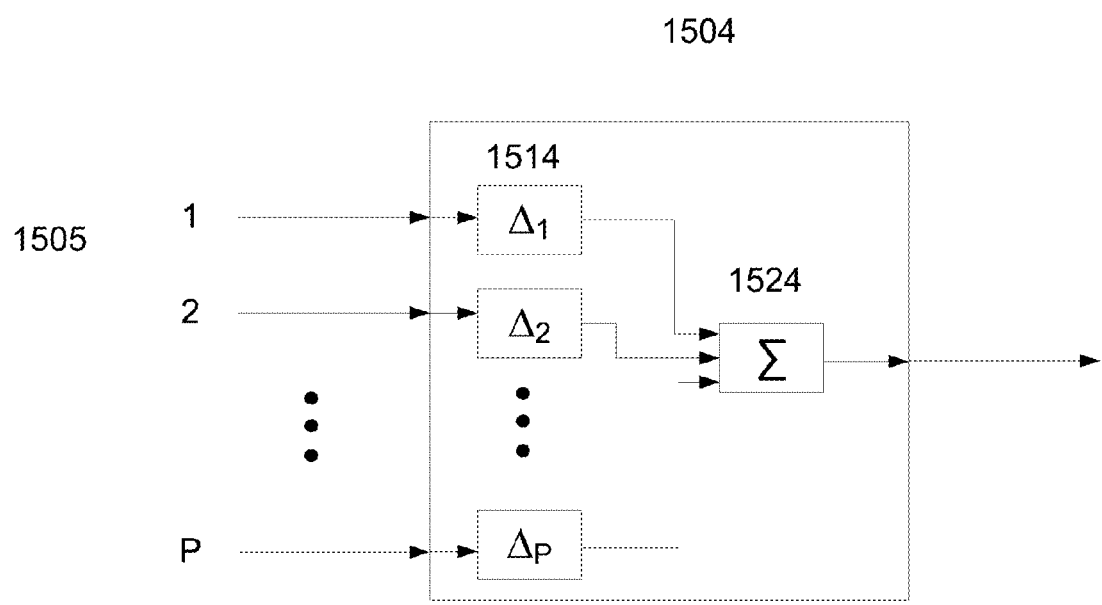
FIG. 15 shows an embodiment of the remote router delay compensation merge unit.

FIG. 15 shows one embodiment of the remote router merge unit. The remote router consists of delay blocks that compensate for fiber as well as serializer/deserializer delays between a DAU and any remote DRUs connected to that DAU. The delay blocks (1514) insure that the multiple DRUs transmit signals synchronously for the downlink path and receive signals synchronously for the uplink paths. The delays are calibrated at the provisioning of the DAS network in an embodiment. In one embodiment, the delay compensation may be incorporated in the local router merge units and/or in the remote router merge units (1504).

As an example, a DAU-DRU daisy chain could include DRU1 connected to the DAU, with DRU2 daisy chained to DRU1. For DRU1 as the first DRU in the daisy chain, signal 1 1505 represents the signal from the DAU (e.g., an optical fiber from the DAU to the DRU). Signal 2 represents the signal from the second DRU in the daisy chain (e.g., an optical fiber from DRU2 to DRU1). The delay from the second DRU is incorporated through the use of delay block $\Delta_2$ 1514 before the signals are summed by summer 1524. For each frequency band (e.g., 700 MHz), the signal on the uplink for the first DRU (i.e., received signal on DRU1), is received at signal 1, delayed by $\Delta_1$, and passed to summer 1524. For this frequency band (e.g., 700 MHz), the signal on the uplink for the second DRU (i.e., received signal on DRU2), is received at signal 2, delayed by $\Delta_2$, and passed to summer 1524. Thus, a combined uplink signal for the frequency band (e.g., 700 MHz) is formed, using remote router merge unit 1504, which is implemented as a component of DRU1. Referring to FIG. 5, remote router merge unit 1504 would be implemented as a component of Remote Router R, with signal 1 in FIG. 15 correlated to signal 507 at Ext Port 1U and signal 2 in FIG. 15 correlated to signal 502' at LAN Port 2. The signal from summer 1524 is sent to the DAU, correlated to signal 502 at LAN Port 1 in FIG. 5. In FIG. 4, signal 502 is received at LAN Port 1 as signal 403.

For a set of daisy chained DRUs, delay adjustment is performed at one or more of the DRUs as the signal traverses up the daisy chain toward the DAU. For implementations in which multiple DRUs are connected to a DAU in a star configuratoin as illustrated in FIG. 2, delay for the multiple DRUs can be introduced at the DAU using the local router merge unit 1404 illustrated in FIG. 14. Referring to FIG. 1, DRU7 receives an uplink signal from a mobile device, for example, a mobile phone. The uplink signal (at a given frequency band) is converted from RF to baseband. The physical delay associated with the optical cables running between the various DRUs in the illustrated embodiment will have the longest delay to DRU7, making it the reference delay.

The signal from DRU7 is then transmitted to DRU6, which receives the signal from DRU7 (e.g., in the 700 MHz band) and combines the receives signal with its own received uplink signal (e.g., 700 megahertz RF signal) that it receives over the air from a mobile device in the coverage area associated with DRU6. The combination is implemented by delaying the signal from DRU7 so that it is synchronized with the uplink signal from DRU6, which is characterized by a reduced delay with respect to the DAU. Then, the combined signal is transmitted to DRU5, where it is combined with a delayed version of the uplink signal received at DRU5. This process is repeated at the DRUs as the signal moves up the daisy chain toward the DAU. At DRU1, after delaying the uplink signal received at DRU1, the combined signal provides alignment for all the uplink signals from the daisy chained DRUs.

Referring to FIG. 2, DAU1 (202) has two optical fibers, fiber 203 connected to Cell 1 207 and fiber 209 connected to Cell 8 213. The delay associated with differing fiber lengths is synchronized by determining the longest delay associated with each of the Cells, setting the longest delay as the reference delay. Because Cell 1 may have a shorter delay than Cell 8, additional delay can be added by DRU2 (204) so that the signals arriving at DAU1 from DRU2 and DRU23 are aligned. The same delays that have been calibrated can be used for uplink as well as downlink. Thus, the downlink for all the antennas, for example Cell 1 with DRU1 through DRU7 and Cell 8 with DRU22 through DRU28, is synchronized so that all the signals are transmitted from the antennas at the same time. Thus, the delay compensation described herein enables the signals to be transmitted at the exact same time in a synchronous manner.

It should be noted that the time delay can be introduced, for example, for the uplink, by the DRUs as the signals are transmitted to the DAU. Additionally, in combination with, or in place of the delay introduction at the DRU closest to the DAU, the delay can be introduced at the DAU to compensate for the differing delays associated with optical fiber 203 and optical fiber 209. Thus, delay compensation can be implemented in the DRUs, in the DAUs, or by both components. As an example, the downlink signals could be transmitted simultaneously from DAU1, arriving at different times at DRU2 and DRU23. The delay can be compensated for at the DRUs, enabling simultaneous transmission from the DRUs. Alternatively, the signal transmitted using optical fiber 203 could be delayed at DAU1 so that the signals arrived simultaneously at DRU2 and DRU23. Time delay for the DRUs in the daisy chain would then be implemented in the DRUs as the signal moves down the daisy chain away from DAU1. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Appendix I is a glossary of terms used herein, including acronyms.

APPENDIX I

Glossary of Terms
ACLR Adjacent Channel Leakage Ratio
ACPR Adjacent Channel Power Ratio
ADC Analog to Digital Converter
AQDM Analog Quadrature Demodulator
AQM Analog Quadrature Modulator
AQDMC Analog Quadrature Demodulator Corrector
AQMC Analog Quadrature Modulator Corrector
BPF Bandpass Filter
CDMA Code Division Multiple Access
CFR Crest Factor Reduction
DAC Digital to Analog Converter
DET Detector
DHMPA Digital Hybrid Mode Power Amplifier
DDC Digital Down Converter
DNC Down Converter
DPA Doherty Power Amplifier
DQDM Digital Quadrature Demodulator
DQM Digital Quadrature Modulator
DSP Digital Signal Processing
DUC Digital Up Converter
EER Envelope Elimination and Restoration
EF Envelope Following
ET Envelope Tracking
EVM Error Vector Magnitude
FFLPA Feedforward Linear Power Amplifier
FIR Finite Impulse Response
FPGA Field-Programmable Gate Array
GSM Global System for Mobile communications
I-Q In-phase/Quadrature
IF Intermediate Frequency
LINC Linear Amplification using Nonlinear Components
LO Local Oscillator
LPF Low Pass Filter
MCPA Multi-Carrier Power Amplifier
MDS Multi-Directional Search
OFDM Orthogonal Frequency Division Multiplexing
PA Power Amplifier
PAPR Peak-to-Average Power Ratio
PD Digital Baseband Predistortion
PLL Phase Locked Loop
QAM Quadrature Amplitude Modulation
QPSK Quadrature Phase Shift Keying
RF Radio Frequency
RRH Remote Radio Head
RRU Remote Radio Head Unit SAW Surface Acoustic Wave Filter
UMTS Universal Mobile Telecommunications System
UPC Up Converter
WCDMA Wideband Code Division Multiple Access
WLAN Wireless Local Area Network

What is claimed is:

1. A system for routing signals in a Distributed Antenna System, the system comprising:
   a plurality of Digital Access Units (DAUs), wherein the plurality of DAUs are coupled and configured to route signals between the plurality of DAUs;
   a plurality of Digital Remote Units (DRUs) coupled to the plurality of DAUs and configured to transport signals between the plurality of DRUs and the plurality of DAUs;
   a plurality of Base Transceiver Stations (BTSs);
   a plurality of Base Transceiver Station sector RF connections coupled to the plurality of DAUs and configured to route signals between the plurality of DAUs and the plurality of Base Transceiver Stations sector RF connections; and
   one or more delay compensation merge units configured to delay signals transmitted from or received by each of the plurality of DRUs.

2. The system of claim 1 wherein each of the one or more delay compensation merge units are integrated as components of each of the plurality of DRUs.

3. The system of claim 1 wherein at least one of the one or more delay compensation merge units is integrated as a component of one of the plurality of DAUs.

4. The system of claim 1 wherein the plurality of DAUs are coupled via at least one of Ethernet cable, Optical Fiber, Microwave Line of Sight Link, Wireless Link, or Satellite Link.

5. The system of claim 1 wherein the plurality of DAUs are coupled to the plurality of DRUs via at least one of Ethernet cable, Optical Fiber, Microwave Line of Sight Link, Wireless Link, or Satellite Link.

6. The system of claim 1 wherein the plurality of DRUs are connected in a daisy chain configuration.

7. The system of claim 1 wherein the plurality of DRUs are connected to the DAUs in a star configuration.

8. The system of claim 1 wherein the plurality of DAUs are connected to the BTSs via at least one of a Ethernet cable, Optical Fiber, Microwave Line of Sight Link, Wireless Link, or Satellite Link.

9. The system of claim 1 wherein the plurality of DRUs are connected in a loop to a plurality of DAUs.

10. The system of claim 1 wherein a single DAU port is connected to a plurality of Base Transceiver Stations.

11. A method for routing signals in a Distributed Antenna System including a plurality of Digital Access Units (DAUs), a plurality of Digital Remote Units (DRUs), a plurality of Base Transceiver Stations (BTSs), and a plurality of Base Transceiver Station sector RF connections, the method comprising:
    transporting signals between the plurality of DRUs and the plurality of DAUs;
    routing the signals between the plurality of DAUs;
    routing the signals between the plurality of DAUs and the plurality of BTS sector RF connections;
    providing routing tables;
    using a first delay compensation merge unit in a first DRU of the plurality of DRUs to delay a first signal; and
    using a second delay compensation merge unit in a second DRU of the plurality of DRUs to delay a second signal.

12. The method of claim 11 wherein a power level of each carrier in each DRU of the plurality of DRUs is independently controlled.

13. The method of claim 11 wherein the first signal comprises an uplink signal associated with the first DRU and the second signal comprises an uplink signal associated with the second DRU.

* * * * *